US008331038B1

(12) United States Patent
Snow et al.

(10) Patent No.: US 8,331,038 B1
(45) Date of Patent: Dec. 11, 2012

(54) VEHICULAR REARVIEW/SIDEVIEW MIRROR ASSEMBLY UTILIZING AFOCAL OPTICAL ASSEMBLY

(75) Inventors: Joseph C. Snow, Lowell, MI (US); James A. Ruse, Allegan, MI (US); Keith D. Foote, Kentwood, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 540 days.

(21) Appl. No.: 12/548,635

(22) Filed: Aug. 27, 2009

Related U.S. Application Data

(60) Provisional application No. 61/101,311, filed on Sep. 30, 2008.

(51) Int. Cl.
*G02B 5/10* (2006.01)
*G02B 7/182* (2006.01)
*G02B 17/00* (2006.01)
*B60R 1/06* (2006.01)

(52) U.S. Cl. .................. 359/727; 359/868; 359/872
(58) Field of Classification Search ............... 359/726, 359/727, 868, 869, 872
See application file for complete search history.

(56) References Cited

U.S. PATENT DOCUMENTS

| | | | |
|---|---|---|---|
| 1,872,905 A * | 8/1932 | Darling | 359/868 |
| 4,331,382 A * | 5/1982 | Graff | 359/868 |
| 5,278,695 A * | 1/1994 | Gebelein et al. | 359/419 |
| 5,559,640 A * | 9/1996 | Vachss et al. | 359/838 |
| 5,594,593 A * | 1/1997 | Milner | 359/726 |
| 5,617,245 A * | 4/1997 | Milner | 359/402 |
| 5,721,639 A * | 2/1998 | Aoshima et al. | 359/509 |
| 6,033,078 A * | 3/2000 | Su et al. | 359/856 |
| 6,104,552 A * | 8/2000 | Thau et al. | 359/726 |
| 6,424,474 B1 * | 7/2002 | Milner | 359/831 |
| 6,862,146 B2 | 3/2005 | Ruse et al. | |
| 7,248,423 B2 * | 7/2007 | Horii et al. | 359/833 |
| 7,322,710 B2 | 1/2008 | Foote et al. | |
| 2002/0063976 A1 * | 5/2002 | Kho | 359/834 |

FOREIGN PATENT DOCUMENTS
JP 7-61288 * 3/1995

* cited by examiner

*Primary Examiner* — Ricky D Shafer
(74) *Attorney, Agent, or Firm* — McGarry Bair PC

(57) ABSTRACT

An afocal rearview mirror assembly for a motor vehicle having a side door and a dashboard includes a housing attached to the motor vehicle adjacent the side door and dashboard. The housing has a low-profile, rounded external portion and an internal portion. A selectively movable reflective element is enclosed within the housing, and has opposed curved surfaces for reflecting unfocused light rays from outside the external portion through the internal portion of the housing. A selectively movable lens is enclosed within the internal portion of the housing for controlling light transmitted from the selectively movable reflective element to an occupant of the motor vehicle. The selectively movable lens can converge the unfocused light rays reflected from the selectively movable reflective element to a focused image observable by the occupant of the motor vehicle.

7 Claims, 27 Drawing Sheets

VEHICULAR REARVIEW/SIDEVIEW MIRROR ASSEMBLY UTILIZING AFOCAL OPTICAL ASSEMBLY

CROSS-REFERENCE TO RELATED APPLICATION

This application claims the benefit of U.S. provisional application Ser. No. 61/101,311, filed Sep. 30, 2008, which is incorporated herein in its entirety.

BACKGROUND OF THE INVENTION

1. Field of the Invention

The invention relates to a vehicular rearview/sideview mirror assembly.

2. Description of the Related Art

Rearview/sideview mirror assemblies are ubiquitous for contemporary vehicles, providing an occupant with a view from the vehicle of rearward and sideward areas collectively extending from the lateral limit of an occupant's peripheral vision to an exterior side of a vehicle, referred to generally as the "operational field of view." Such mirror assemblies are typically mounted to the exterior of the vehicle at or proximate the front of the driver's and front passenger's doors (i.e. "side-mounted"). A conventional mounting location is adjacent the forward corner of the side windows. It is known to use afocal mirrors as rearview/sideview mirrors.

To adjust and expand the area of the rearward and sideward views observable by an occupant, the reflective element of a side-mounted mirror assembly can be configured for permanent or intermittent extension away from the vehicle exterior. However, this can project the reflective element into the vehicle airflow, resulting in drag, wind noise, and excess fuel consumption.

Conventional rearview/sideview mirror assemblies are typically unable to provide an occupant with an uninterrupted view of the entire area to the rear and side of a vehicle without moving the reflective element, or utilizing a plurality of reflective elements, each associated with a different field of view. Thus, a portion of the zone to the rear and side of a vehicle, referred to herein as the "hidden zone," is not readily visible in the reflective element. Moving the reflective element is generally impracticable; utilizing a plurality of reflective elements will increase the aerodynamic drag force associated with a side-mounted mirror assembly.

Conventional side-mounted mirror assemblies can also incorporate several different elements, such as reflective elements, lenses, and the like, in order to maximize the operational field of view, while adhering to automotive safety and performance standards. However, the greater the number of elements making up a mirror assembly, the larger the mirror assembly housing must be to accommodate the elements, and the greater the aerodynamic profile associated with the projection of the mirror assembly from the vehicle exterior.

It would be desirable to utilize a rearview/sideview vehicle mirror assembly incorporating a minimum number of operational elements, and having a reduced weight and aerodynamic profile, capable of providing the operator of the vehicle with an enhanced view of objects, such as approaching vehicles, to the rear and side of the vehicle, which complies with automotive safety and performance standards.

BRIEF DESCRIPTION OF THE INVENTION

An afocal rearview mirror assembly for a motor vehicle having a side door and a dashboard includes a housing attached to the motor vehicle adjacent the side door and dashboard. The housing has a low-profile, rounded external portion and an internal portion. A selectively movable reflective element is enclosed within the housing, and has opposed curved surfaces for reflecting unfocused light rays from outside the external portion through the internal portion of the housing. A selectively movable lens is enclosed within the internal portion of the housing for controlling light transmitted from the selectively movable reflective element to an occupant of the motor vehicle. The selectively movable lens can converge the unfocused light rays reflected from the selectively movable reflective element to a focused image observable by the occupant of the motor vehicle.

BRIEF DESCRIPTION OF THE DRAWINGS

In the drawings:

FIG. 11 B is a sectional view taken along view line 11B-11B of FIG. 11.

DESCRIPTION OF EMBODIMENTS OF THE INVENTION

The invention can comprise an afocal rearview mirror assembly having an aerodynamic profile, which can include a reflective element and a lens assembly. The afocal rearview mirror assembly can provide an occupant, such as the operator, of a motor vehicle with a high-quality image of an exterior rear region and an exterior side region of the motor vehicle. The mirror assembly can comprise a housing mounted to a forward portion of the motor vehicle. The housing can have a light-collecting portion and an image portion, and can provide a high-quality image readily visible to the occupant at an optimal location, such as adjacent the windshield of the vehicle. Three embodiments of the invention are illustrated and described herein.

As used herein, an optical assembly refers to an assembly comprising at least one of a reflective element and a lens. As used herein, a lens assembly refers to an assembly comprising at least one lens. As used herein, an afocal rearview mirror assembly, or rearview mirror assembly, or mirror assembly, refers to an optical assembly, a housing, electronic control devices, and mounting components enabling the mirror assembly to be coupled with a motor vehicle.

Figure 1:
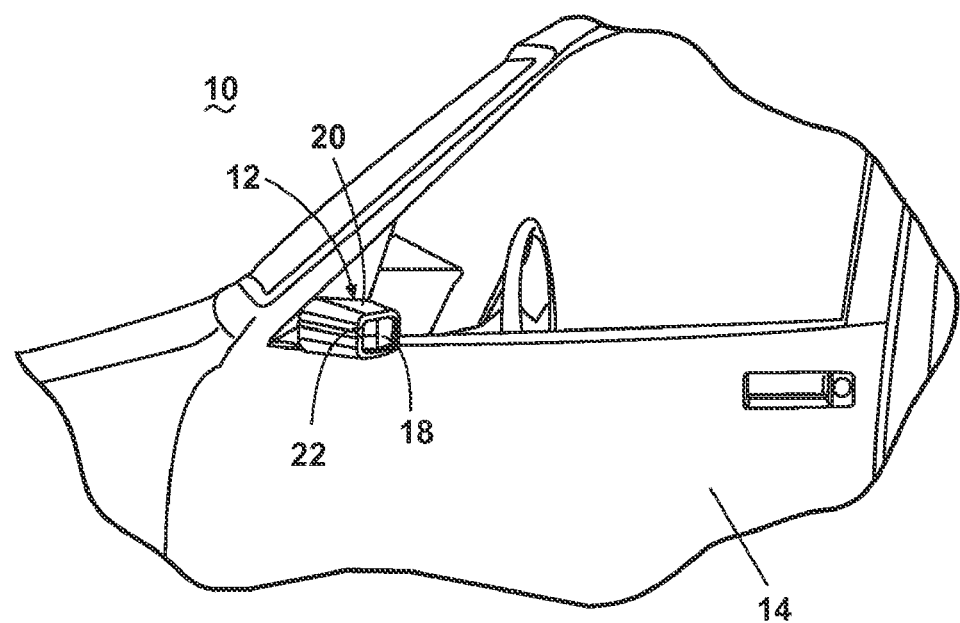
FIG. 1 is a side elevation view of a portion of the exterior of a motor vehicle illustrating a first embodiment of the invention comprising an afocal rearview mirror assembly.

FIG. 1 illustrates a first embodiment of an afocal rearview mirror assembly 12 coupled to the driver's side door 14 of a known motor vehicle 10, such as an automobile. The mirror assembly 12 can comprise an optical assembly, such as the afocal mirror assembly described and illustrated in U.S. Pat. No. 6,862,146 to Ruse et al., which is fully incorporated by reference herein.

Figure 2:
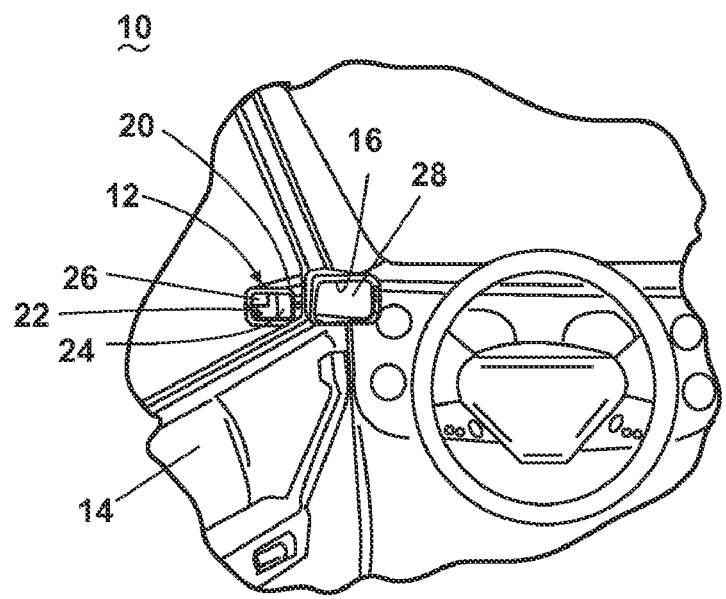
FIG. 2 is an elevation view of a portion of the interior of the motor vehicle of FIG. 1 showing a second view of the afocal rearview mirror assembly.

Referring also to FIG. 2, the mirror assembly 12 can have a housing 20 enclosing a lens assembly, illustrated as an objective lens assembly 18 oriented rearward for refracting, in this case collecting and collimating, light originating in the rear and side areas associated with the vehicle 10, as hereinafter described. The housing 20 can have a first portion with an objective lens window 22 associated with the objective lens assembly 18 through which light can be refracted and pass into the interior of the housing 20. The housing 20 can also have a second apportionment with an interior view window 16 oriented to provide an image from the objective lens assembly 18 which can be visible to an operator of the vehicle, as hereinafter described.

Figure 3:
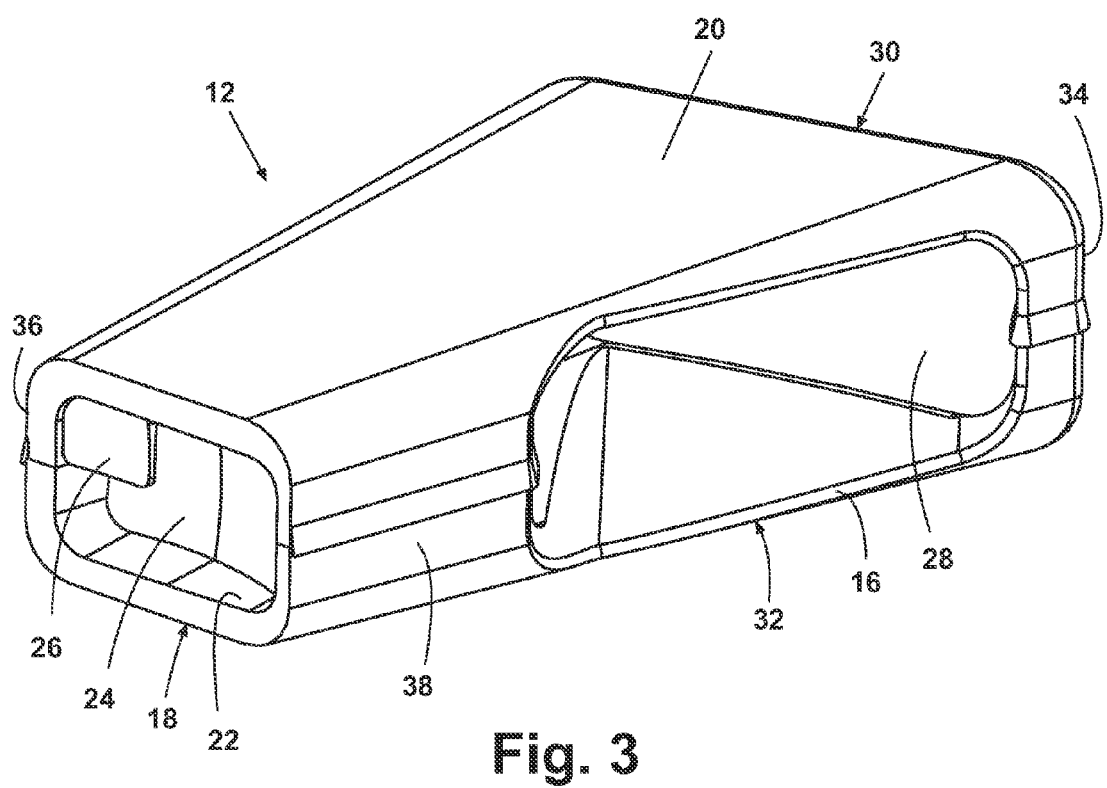
FIG. 3 is a perspective view of the afocal rearview mirror assembly of FIG. 1.
Figure 4:
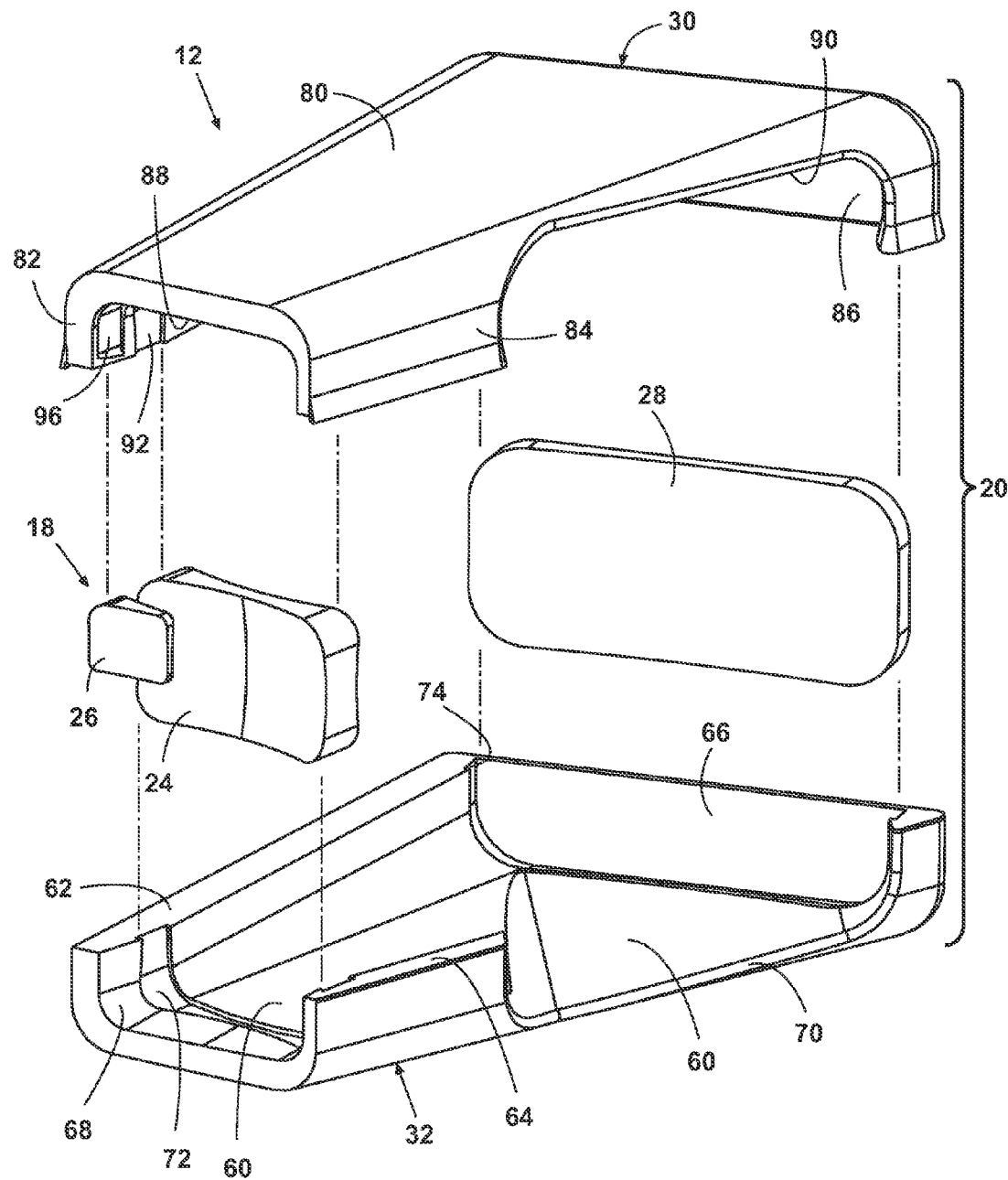
FIG. 4 is an exploded view of the afocal rearview mirror assembly of FIG. 3 illustrating housing elements, lenses, and a reflective element.

As illustrated in FIGS. 3 and 4, the housing 20 can comprise an upper shell 30 and a mating lower shell 32, which together form a hollow body for enclosing the objective lens assembly 18 and a reflective element 28. The housing can comprise a rear wall 34, an outer side wall 36, an inner side wall 38, a lower wall 60, and an upper wall 80, configured generally in the shape of a truncated triangle, with the base of the triangle, i.e. the rear wall 34, facing generally toward the front of the vehicle, and the apex of the triangle facing generally toward the rear. The housing 20 can have other suitable configurations consistent with the vehicle in which the mirror assembly 12 can be incorporated, so long as the geometric and functional relationships described herein concerning the lenses and reflective element are maintained.

Referring to FIG. 4, the housing 20 can enclose a lens assembly having a lens 24, also referred to herein as an objective lens, associated with an operational field of view, and a spotter lens 26, for expanding the view of the rear and side areas associated with the vehicle 10, particularly the hidden zone, positioned generally at the apex of the housing 20. A reflective element 28 can be positioned generally at the base of the housing 20.

Figure 7:
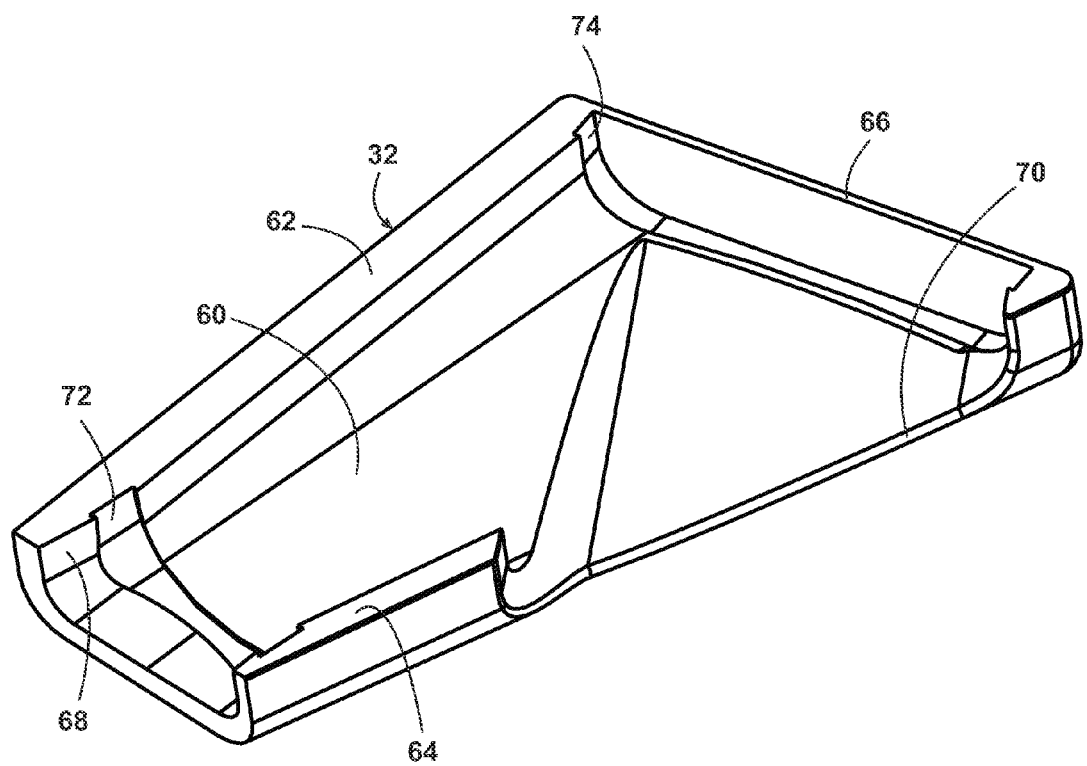
FIG. 7 is a perspective view of a first housing element comprising a portion of the afocal rearview mirror assembly of FIG. 1.

Referring now to FIG. 7, the lower shell 32 can be a generally concave polygonal body comprising a lower wall 60. A distal wall 62, a proximal wall 64, and a rear wall 66 can extend orthogonally away from the lower wall 60. The distal wall 62 and the proximal wall 64 can terminate opposite the rear wall 66 to define an open objective lens window portion 68 forming a part of the objective lens window 22. The proximal wall 64 can be interrupted by an interior view window portion 70 forming a part of the interior view window 16. An objective lens channel 72 adapted for seating of the objective lens 24 therein can extend along the proximal wall 64, the lower wall 60, and the distal wall 62 adjacent the objective lens window portion 68. A reflective element channel 74 adapted for seating of the reflective element 28 therein can extend along the proximal wall 64, the lower wall 60, and the distal wall 62 adjacent the rear wall 66.

Figure 8:
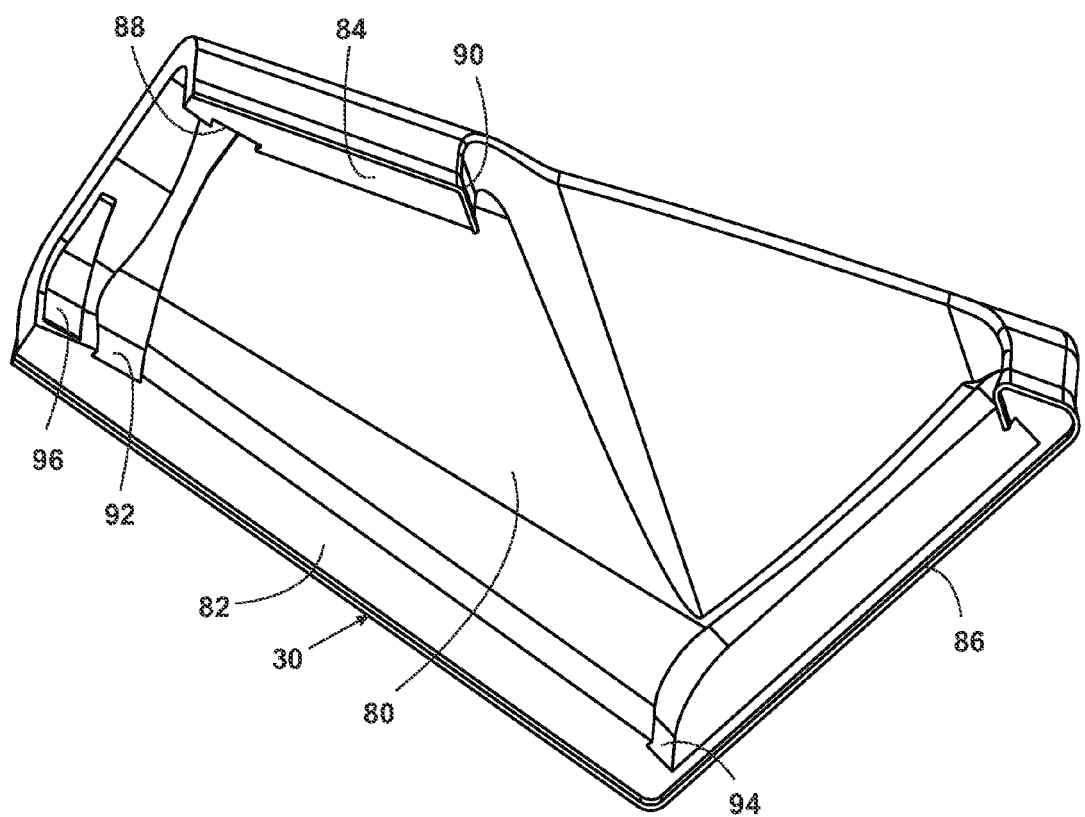
FIG. 8 is a perspective view of a second housing element comprising a portion of the afocal rearview mirror assembly of FIG. 1.

Referring now to FIG. 8, the upper shell 30 can be a generally concave polygonal body comprising an upper wall 80. A distal wall 82, a proximal wall 84, and a rear wall 86 can extend orthogonally away from the upper wall 80. The distal wall 82 and the proximal wall 84 can terminate opposite the rear wall 86 to define an open objective lens window portion 88 forming a part of the objective lens window 22. The proximal wall 84 can be interrupted by an interior view window portion 90 forming a part of the interior view window 16. An objective lens channel 92 adapted for seating of the objective lens 24 therein can extend along the proximal wall 84, the lower wall 80, and the distal wall 82 adjacent the objective lens window portion 88. A spotter lens channel 96 for seating of the spotter lens 26 therein can extend along the distal wall 82 and the lower wall 80, intermediate the rearview lens channel 92 and the objective lens window portion 88. A reflective element channel 94 adapted for seating of the reflective element 28 therein can extend along the proximal wall 84, the lower wall 80, and the distal wall 82 adjacent the rear wall 86.

Figure 5:
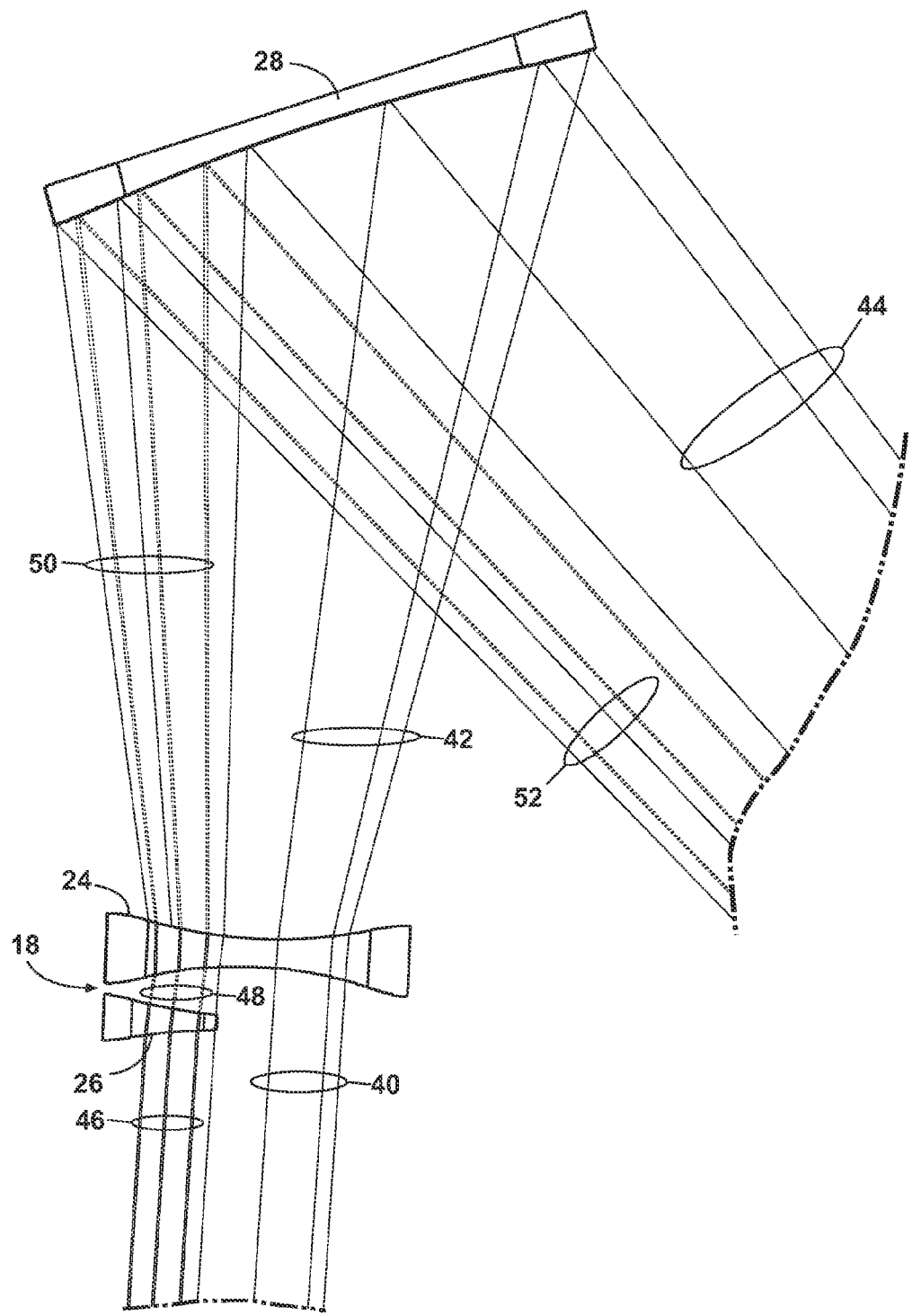
FIG. 5 is a first schematic representation of the light passing through the afocal rearview mirror assembly of FIG. 1.
Figure 6:
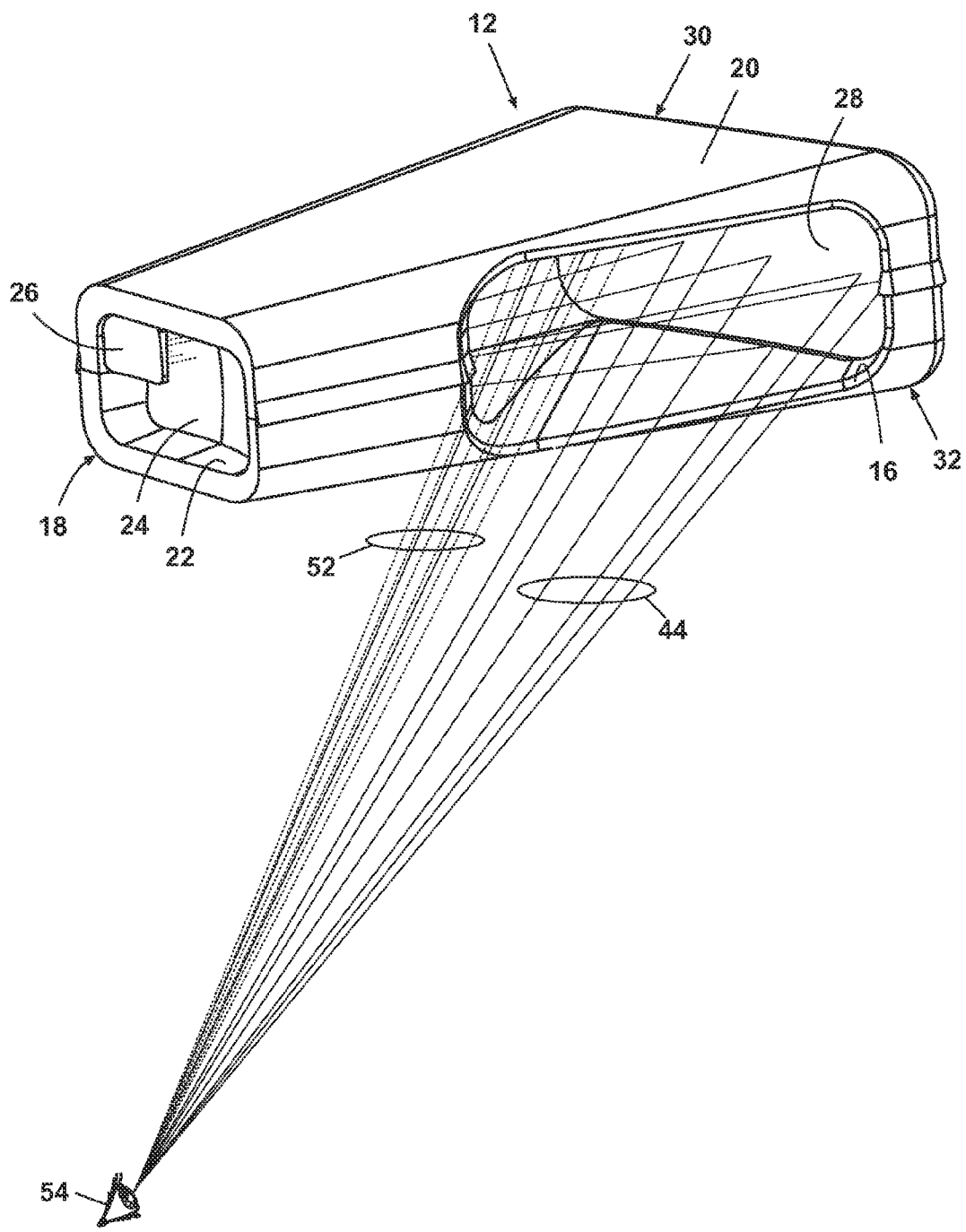
FIG. 6 is a second schematic representation of the light transmitted to a driver's eye through the afocal rearview mirror assembly of FIG. 1.
Figure 9:
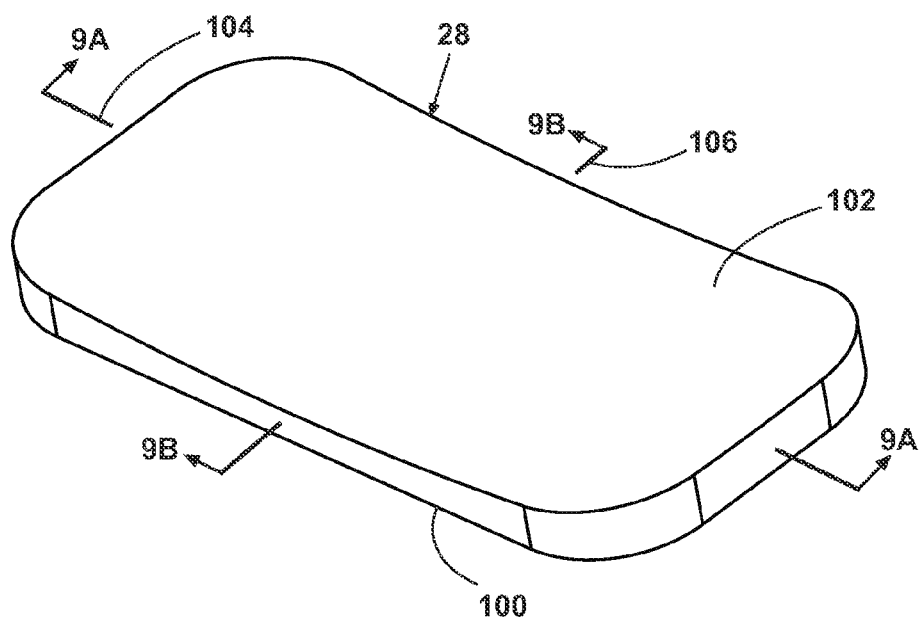
FIG. 9 is a perspective view of the reflective element comprising a portion of the afocal rearview mirror assembly of FIG. 1.
Figure 9A:
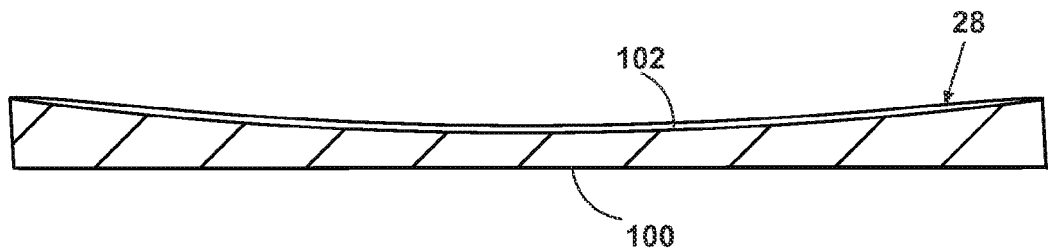
FIG. 9A is a sectional view taken along view line 9A-9A of FIG. 9.
Figure 9B:
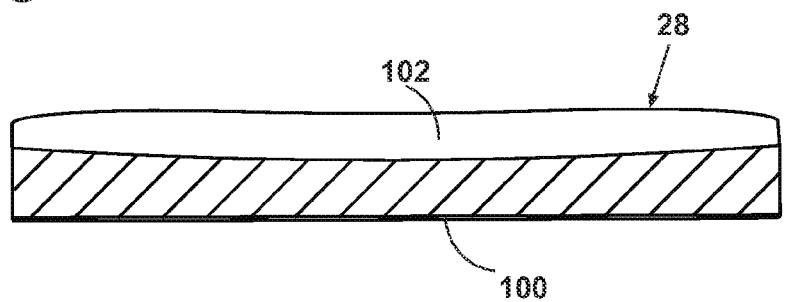
FIG. 9B is a sectional view taken along view line 9B-9B of FIG. 9.

Referring now to FIGS. 9, 9A, and 9B, the reflective element 28 can be a somewhat plate-like, generally rectangular body comprising a planar surface 100 and an opposed concave surface 102, and defining a longitudinal axis 104 and an orthogonal transverse axis 106. The planar surface 100 can be coated in a well-known manner with a reflective coating (not shown). Alternatively, the reflective coating can be applied to the concave surface 102. In either alternative, the concavity of the concave surface 102 can be selected in order to collect and focus light impinging on the reflective coating to a focal point that can be at a distance from the reflective element 28 corresponding to the vehicle operator's eye in order to produce an operator-viewable reflected image of objects in the rear and side areas associated with the vehicle (FIGS. 5 and 6).

Figure 10:
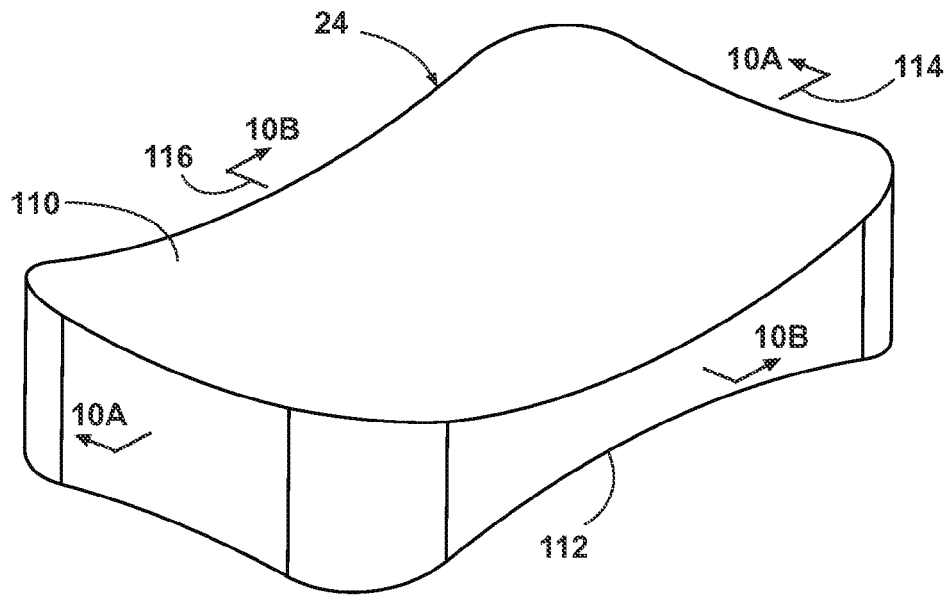
FIG. 10 is a perspective view of a rearview lens comprising a portion of the afocal rearview mirror assembly of FIG. 1.
Figure 10A:
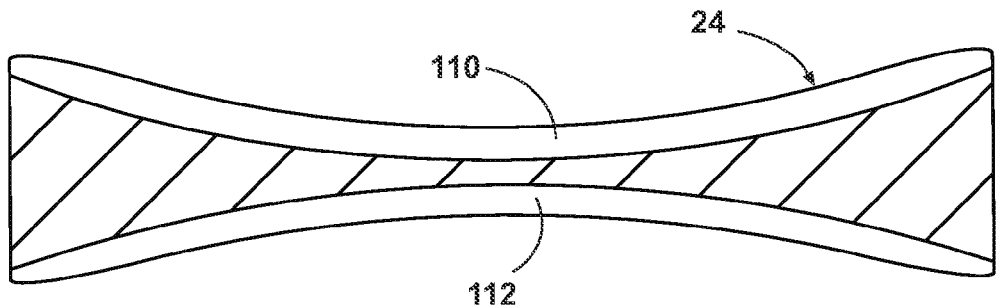
FIG. 10A is a sectional view taken along view line 10A-10A of FIG. 10.
Figure 10B:
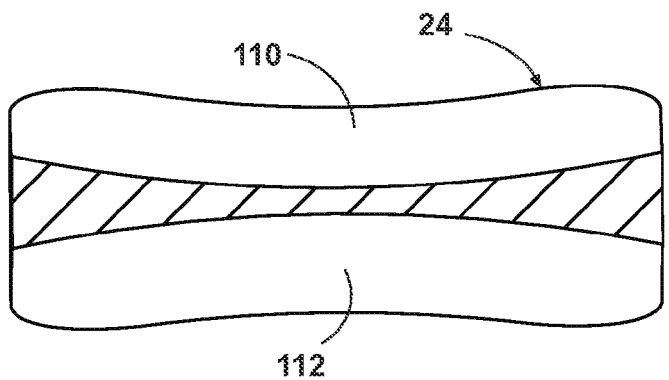
FIG. 10B is a sectional view taken along view line 10B-10B of FIG. 10.

Referring now to FIGS. 10, 10A, and 10B, the objective lens 24 can be a somewhat plate-like, generally rectangular body comprising an obverse concave surface 110 and an opposed, reverse concave surface 112, and defining a longitudinal axis 114 and an orthogonal transverse axis 116. The concavity of each of the obverse concave surface 110 and the reverse concave surface 112 can be selected so that, in association with the reflective element 28, the objective lens 24 can refract light passing through the objective lens 24 onto the reflective coating of the reflective element 28 to a focal point that can be at a distance from the reflective element 28 corresponding to the vehicle operator's eye in order to produce an operator-viewable reflected image of objects in the rear and side areas associated with the vehicle (FIGS. 5 and 6).

Figure 11:
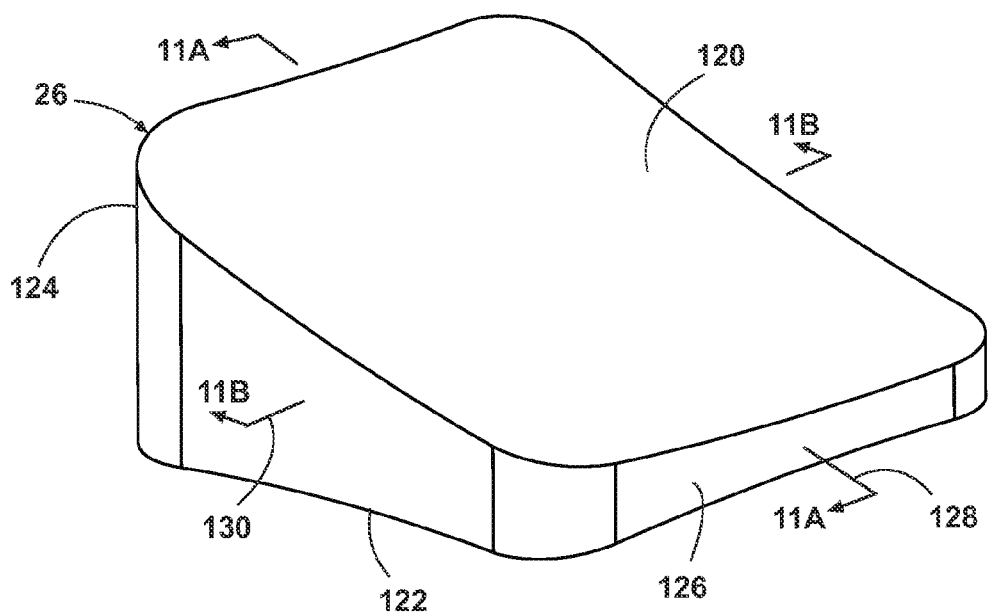
FIG. 11 is a perspective view of a spotter lens comprising a portion of the afocal rearview mirror assembly of FIG. 1.
Figure 11A:
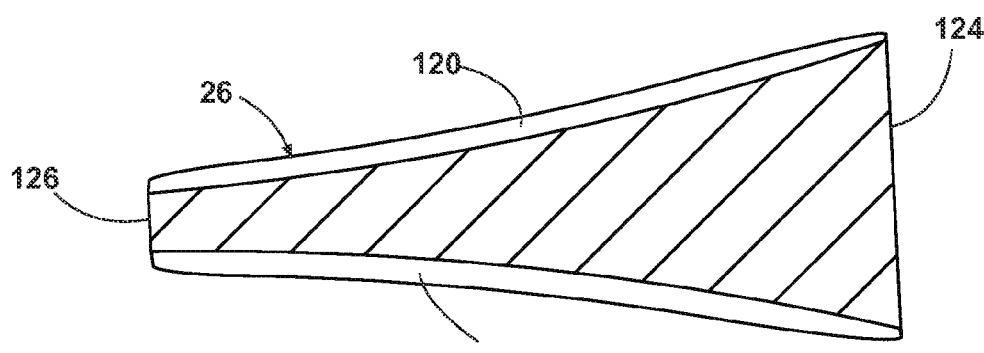
FIG. 11A is a sectional view taken along view line 11A-11A of FIG. 11.
Figure 11B:
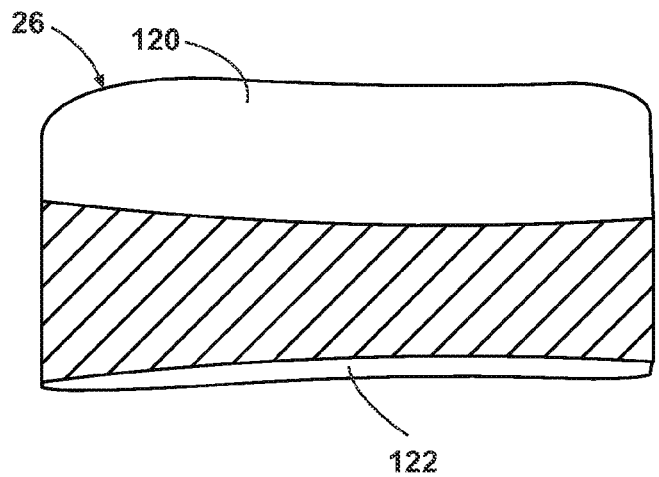

Referring now to FIGS. 11, 11A, and 11B, the spotter lens 26 can be a somewhat wedge-shaped, generally rectilinear body comprising an obverse concave surface 120 and an opposed, reverse concave surface 122, and defining a longitudinal axis 124 and an orthogonal transverse axis 126. The concavity of each of the obverse concave surface 120 and the reverse concave surface 122, and the relative orientation of the obverse concave surface 120 and the reverse concave surface 122, can be selected so that, in association with the reflective element 28 and the objective lens 24, the spotter lens 26 can refract light passing through the spotter lens 26 and the objective lens 24 onto the reflective coating of the reflective element 28 to a focal point that can be at a distance from the reflective element 28 corresponding to the vehicle operator's eye in order to produce an operator-viewable reflected image of objects in the hidden zone (FIGS. 5 and 6).

Referring again to FIGS. 3 and 4, as assembled, the afocal rearview mirror assembly 12 can comprise the objective lens assembly 18 installed interiorly of the objective lens window 22 with the spotter lens 26 immediately adjacent the objective lens window 22 just forward of the objective lens 24. The spotter lens 26 is illustrated as occupying an upper outward corner of the objective lens window 22, which places the spotter lens 26 laterally outwardly away from the vehicle 10. Alternatively, the spotter lens 26 can be located in a different quadrant of the objective lens window 22 so long as the image of the rear and side areas associated with the vehicle can be suitably captured and transmitted to the vehicle operator. Alternatively, the spotter lens 26 can be integrated into the objective lens 24 in a manner similar to a lens for bi-focal glasses.

The reflective element 28 extends along the rear wall 34, with the planar surface 100 adjacent or in registry with the rear wall 34. The reflective element 28 can be oriented so that images reflected from the reflective element 28 can be viewed through the interior view window 16 by the vehicle operator. The afocal rearview mirror assembly 12 can be installed to the vehicle 10, preferably in the motor vehicle door 14 forward of the side window, so that the objective lens window 22 is exterior of the motor vehicle 10 for collection of light from the rear and side areas associated with the vehicle, and the interior view window 16 opens into the interior of the motor vehicle 10 for viewing by the vehicle operator. As illustrated in FIGS. 1 and 2, the objective lens window portion can extend to the exterior of the vehicle, and the interior view window portion can extend to the interior of the vehicle. The configuration of the mirror assembly 12 contributes to a minimization of the aerodynamic profile external of the vehicle, and to a reduction in weight.

Referring again to FIGS. 5 and 6, object light 40 entering the objective lens window 22 from objects in the operational field of view can pass through the objective lens 24 as refracted light 42. The refracted light 42 can be directed onto the reflective element 28, and can be reflected as reflected light 44. Hidden zone object light 46 entering the objective lens window 22 from objects in the hidden zone can pass through the spotter lens 26 as refracted light 48, can pass through the objective lens 24 as further refracted light 50, and can be directed onto the reflective element 28 and reflected as reflected light 52. Both the objective lens reflected light 44 and the spotter lens reflected light 52 can be focused, as illustrated in FIG. 6, so that the focal point corresponds generally with the eyes 54 of the vehicle operator. The operator can then see a relatively large image of the operational field of view, with an image of the hidden zone embedded in a corner of the large operational field of view image.

The refraction of the light rays can be generally reduced, i.e. the refracted light 42, 48, 50 can be generally much closer to being parallel to the normal vectors at the lens surfaces, thus producing fewer image aberrations. The objective lens 24 and spotter lens 26 can be sized so that rotation of the reflective element 28 by a tilt actuator (not shown) can enable the reflected light 44, 52 to "fill" the entire reflective element and reach the operator's eyes 54.

The reflective element 28 can be operably attached to a known adjustment assembly or tilt actuator (not shown) for selectively rotating the reflective element 28 about a transverse axis and a longitudinal axis to adjust the focal point for a particular operator. The adjustment assembly can be housed in a chamber (not shown) associated with the rear wall 34 of the housing 20 and adapted to fixedly mount the adjustment assembly therein. The adjustment assembly can be similar in essential respects to a tilt actuator for adjusting an external rearview reflective element about a horizontal and a vertical axis. An example of such a tilt actuator is shown and described in U.S. Pat. No. 7,322,710 entitled "Vehicle Mirror Actuator With Single Motor Actuation And Inboard Center Of Gravity And Vehicular Mirror Incorporating The Same," which is fully incorporated herein by reference.

The afocal rearview mirror assembly described herein is an improvement over the prior art in several unique ways. The configuration of the mirror assembly housing results in a reduced exterior profile and reduced aerodynamic drag force. The afocal rearview mirror assembly can provide a view of the exterior rear region and exterior side region associated with a motor vehicle, which can include the hidden zone. It can provide a flat field of view, thereby reducing or eliminating edge distortion. The brightness of the image can be higher and clearer than prior art mirror assemblies utilizing multiple optical components. The angular magnification of the primary image can be retained at approximately a 1:1 ratio. The afocal rearview mirror assembly can have a lower weight and lower manufacturing costs than other mirrors. The mirror assembly can also reduce eye strain in the driver.

The afocal rearview mirror assembly can accommodate drivers of varying sizes without adjustment of the exterior exposed optical components, thus minimizing the possibility of obstruction by housing lips or rims. The afocal rearview mirror assembly can minimize distortion due to off-axis refraction of the "spotter" or hidden zone component. Because of the reflective element, the hidden zone image can be viewed more "straight-on" and the total refraction of the light can be less, which can provide an enhanced image. Finally, the afocal rearview mirror assembly can generally protrude from the exterior of the vehicle less than a comparable prior art mirror assembly.

A second embodiment of the invention, illustrated in FIGS. 12-21, has fewer optical assembly elements and, consequently, a more aerodynamic housing. This embodiment can comprise a dual element afocal rearview mirror assembly comprising an optical assembly, including a lens assembly illustrated as an interior view lens, for providing a high-quality image of an enlarged operational field of view to the driver of a motor vehicle. The mirror assembly can comprise a housing incorporated into the driver side vehicle door enclosing a convex reflective element and a convex objective lens, with an exterior light-collecting portion and an interior image portion which can provide a high-quality image adjacent a lower corner of the front windshield of the vehicle.

Figure 12:
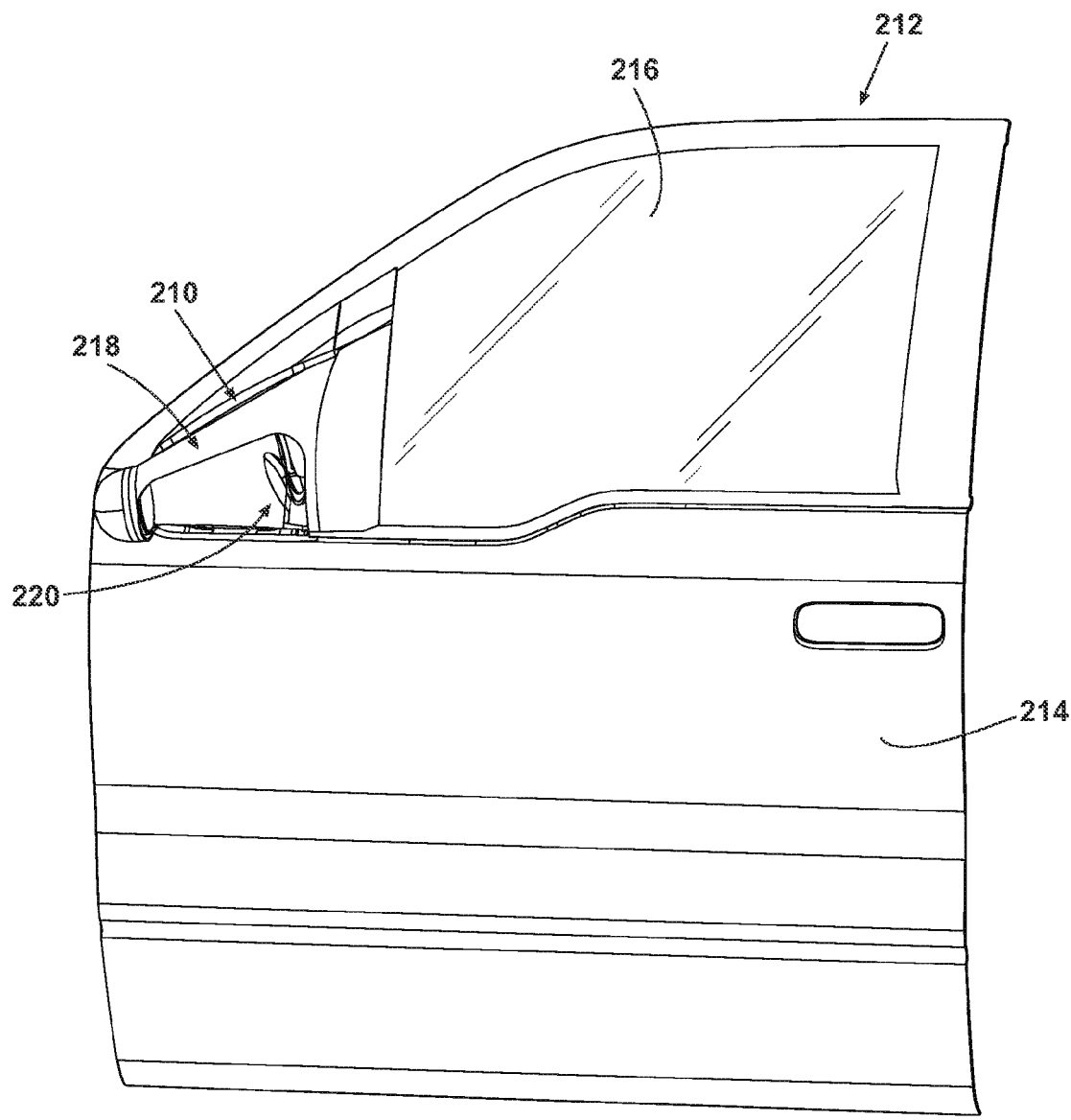
FIG. 12 is a side elevation view of a portion of the driver side door of a motor vehicle illustrating a second embodiment of the invention comprising a dual element afocal rearview mirror assembly.
Figure 13:
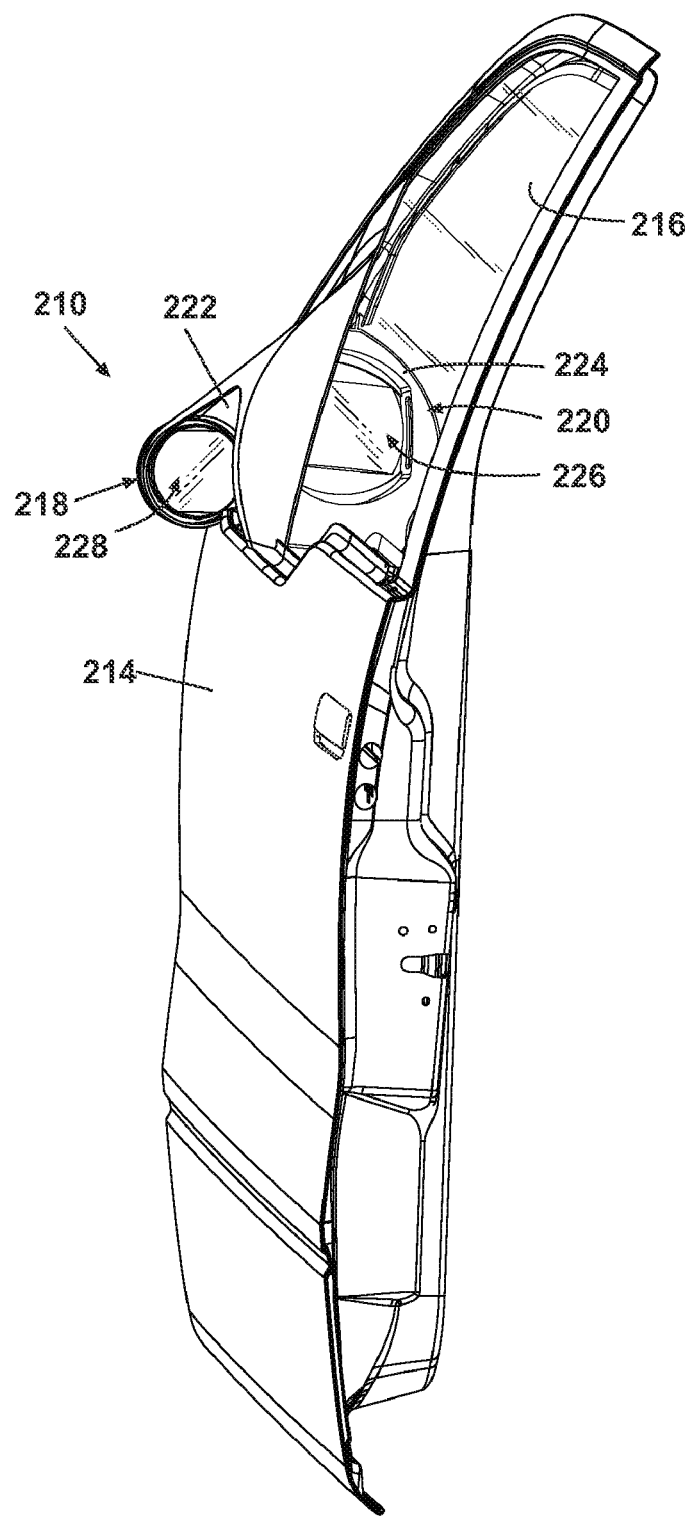
FIG. 13 is a perspective view from the rear of the door illustrated in FIG. 12 showing a second view of the dual element afocal rearview mirror assembly.
Figure 14:
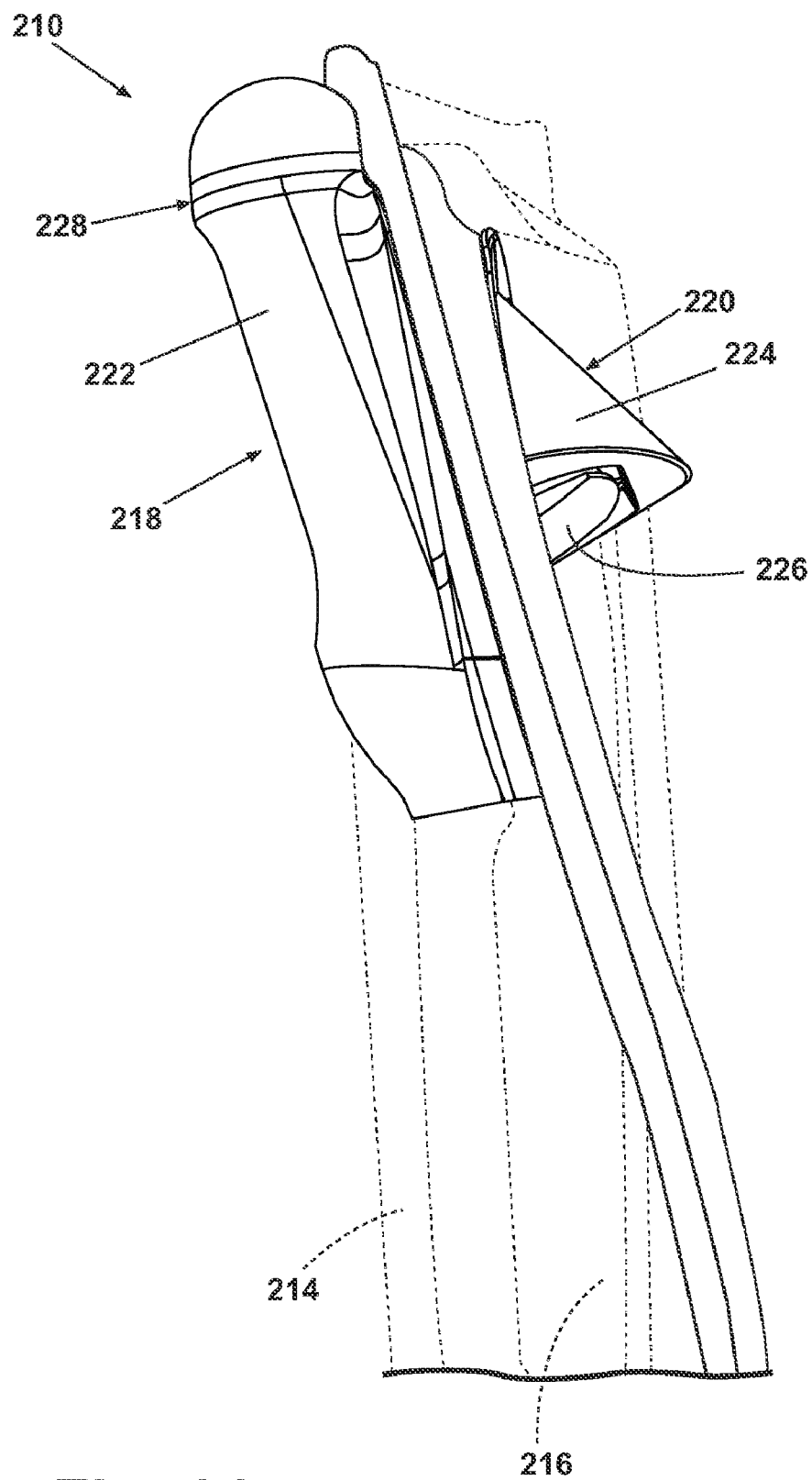
FIG. 14 is a plan view from above of a portion of the door illustrated in FIG. 12 showing a third view of the dual element afocal rearview mirror assembly.

An afocal rearview mirror assembly 210 is illustrated in FIGS. 12-14 incorporated into driver's side door 214 of a conventional motor vehicle 212, such as an automobile. The afocal rearview mirror assembly 210 is illustrated as incorporated into the door 214 immediately forward of the window glass 216 and occupying a forward, typically triangle-shaped corner. The mirror assembly 210 can be mounted to other portions of the vehicle, such as a fender.

Referring specifically to FIGS. 13 and 14, the afocal rearview mirror assembly 210 can comprise an exterior light-collecting portion 218 and an interior image portion 220 having an outer housing 222 and an inner housing 224 combined into a housing extending along both an exterior and an interior side of the door 214. The outer housing 222 encloses a reflective element assembly 228. The inner housing 224 can enclose an interior view lens assembly 226. The reflective element assembly 228 can be oriented rearward for collecting and collimating light from the operational field of view, as hereinafter described. The interior view lens assembly 226 can be oriented so that light reflected from the reflective element assembly 228 can pass through the interior view lens assembly 226 to be viewed by an occupant in the vehicle.

Figure 15:
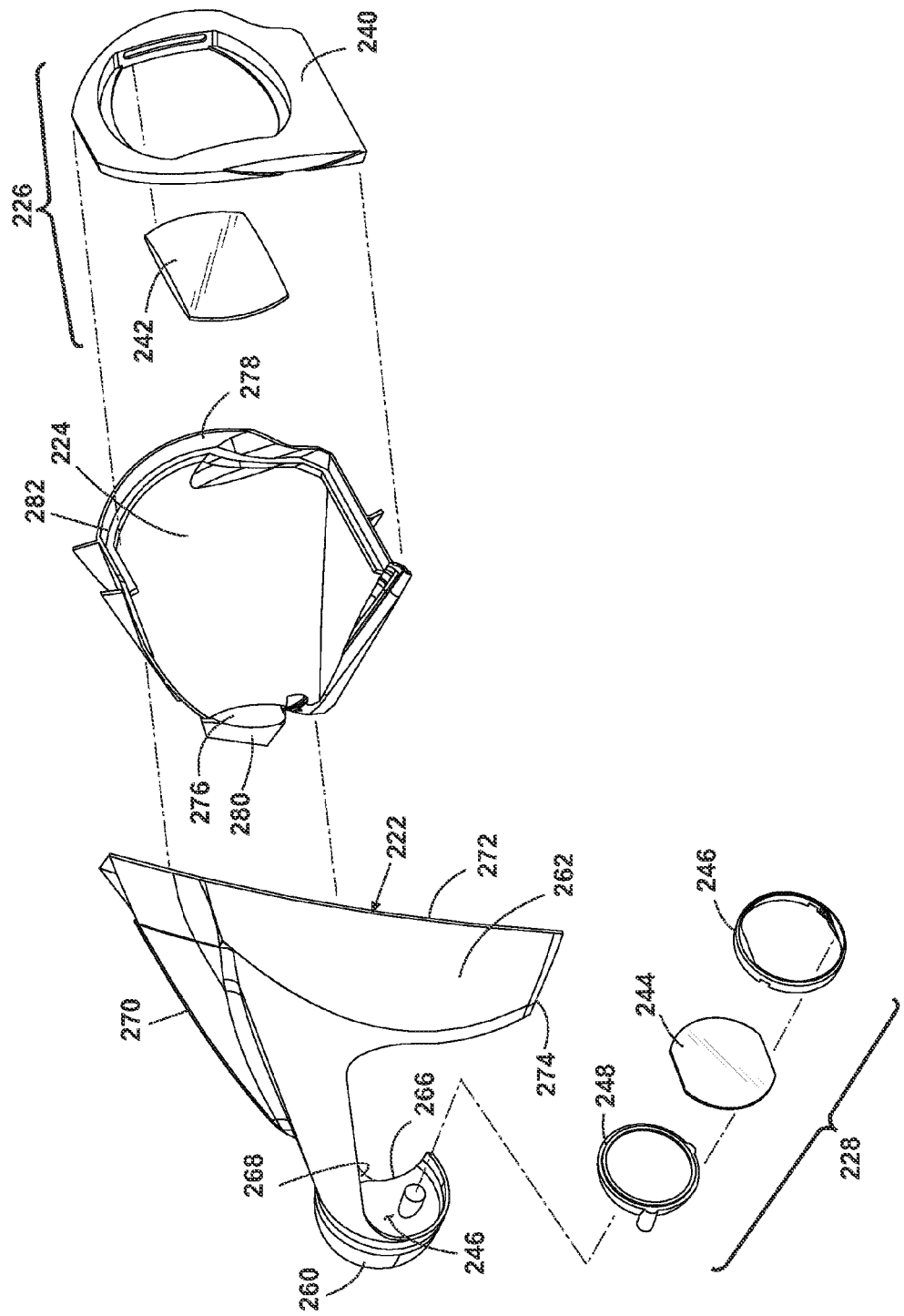
FIG. 15 is an exploded view of the dual element afocal rearview mirror assembly of FIG. 12 illustrating housing elements and optical elements.

As illustrated in FIG. 15, the reflective element assembly 228 can comprise a reflective element 244, a retaining ring 246, and a reflective element adjuster 248. The interior view lens assembly 226 can comprise an interior view lens 242 held within an outer lens frame 240. The interior view lens 242 can be held by an inner lens frame (not shown), which in turn can be movably coupled within the outer lens frame 240.

Figure 16:
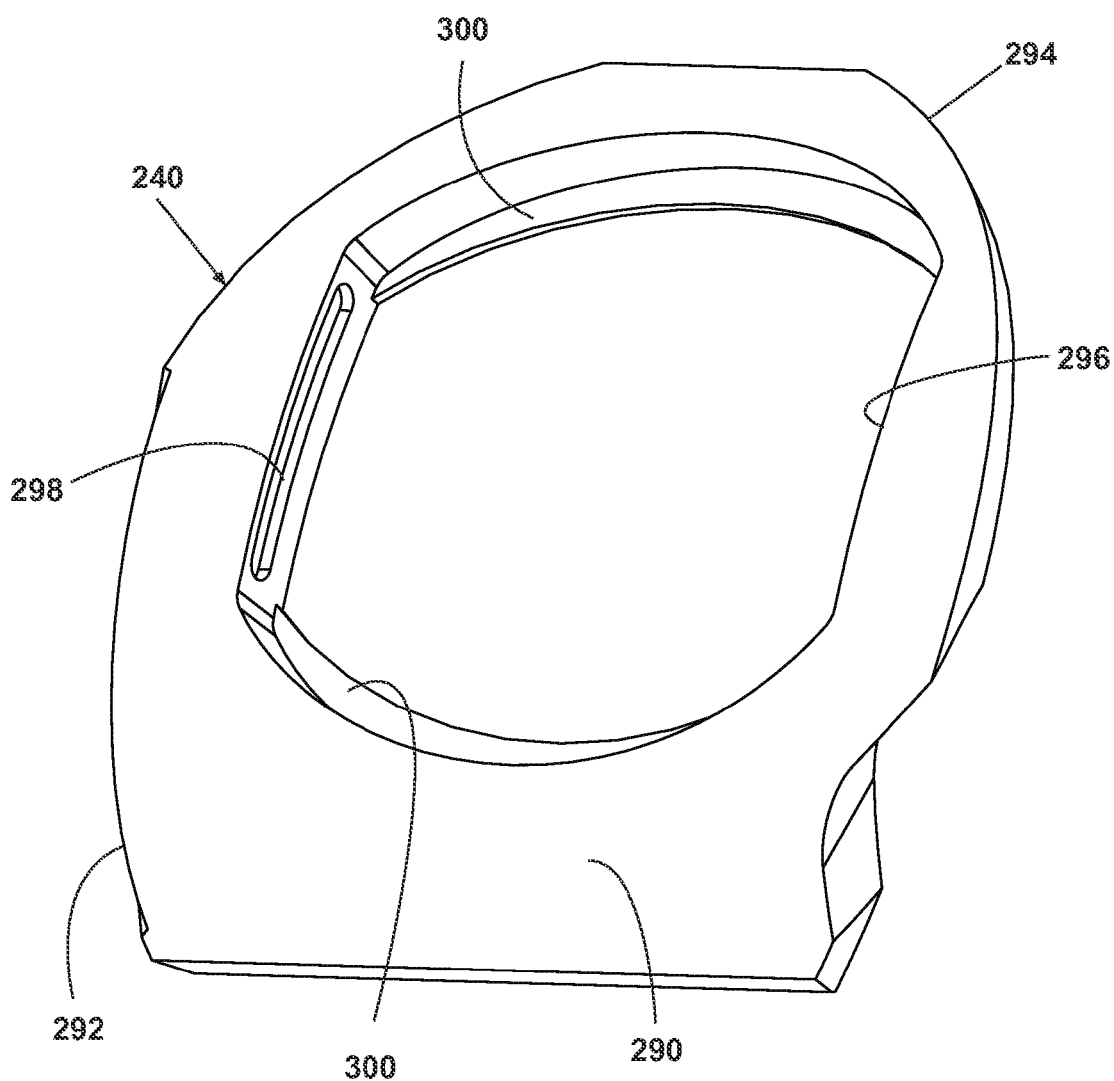
FIG. 16 is a perspective view of an obverse surface of a lens frame illustrated in FIG. 15.
Figure 17:
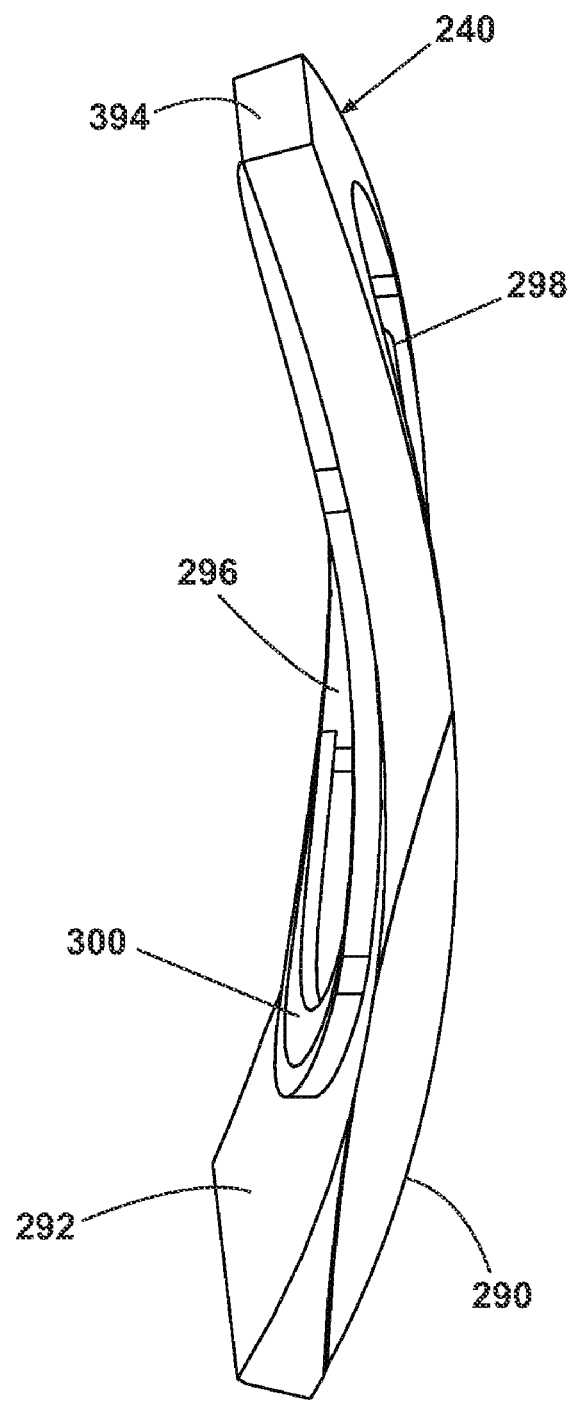
FIG. 17 is a perspective view from the side of the lens frame illustrated in FIG. 16.

Referring to FIGS. 16 and 17, the outer lens frame 240 is illustrated as an irregularly shaped, generally arcuate body having a convex obverse side 290 and an opposed concave reverse side 292. The outer lens frame 240 is illustrated as having an irregular perimetric edge 294 with a configuration complementary to adjoining interior components, and a lens opening 296 for mounting of the interior view lens 242 and inner lens frame (not shown). The edge 294 can be suitably configured to enable the outer lens frame 240 to be conformedly integrated with the vehicle dash when the door 214 is closed.

The lens opening 296 can be provided with opposed lens adjustment slots 298, adapted to hold an inner lens frame (not shown). A pair of opposed curved mounting flanges 300 can extend radially inwardly somewhat into the lens opening 296 on the reverse side 292. The inner lens frame can include an opposed pair of projections or pins (not shown) adapted for slidable coupling with the slots 298, enabling the inner lens frame and the interior view lens 242 to effectively rotate about the pivot center of the assembly, i.e. the reflective element adjuster 248. The interior view lens 242 can thus be selectively moved up and down by the movement of the projections (not shown) along the slots 298 to accommodate the head positions of different drivers. The upper and lower edges (not shown) of the inner lens frame can slidably engage the mounting flanges 300. The width of the mounting flanges 300 can somewhat exceed the maximum travel distance of the inner lens frame so that the upper and lower edges can remain in slidable registry with the mounting flanges 300. A suitable gasket (not shown) can optionally be located intermediate the upper and lower edges of the inner lens frame and the mounting flanges 300.

The perimetric edge 294 of the lens frame 240 can be adapted for integral registry with the assembled outer housing 222 and inner housing 224. If the outer housing 222 and the inner housing 224 assume a configuration different than that illustrated herein in order to integrate with the design and aesthetics of the vehicle, the lens frame 240 can be adapted with a different configuration in order to readily register with the outer and inner housings 222, 224.

Figure 18:
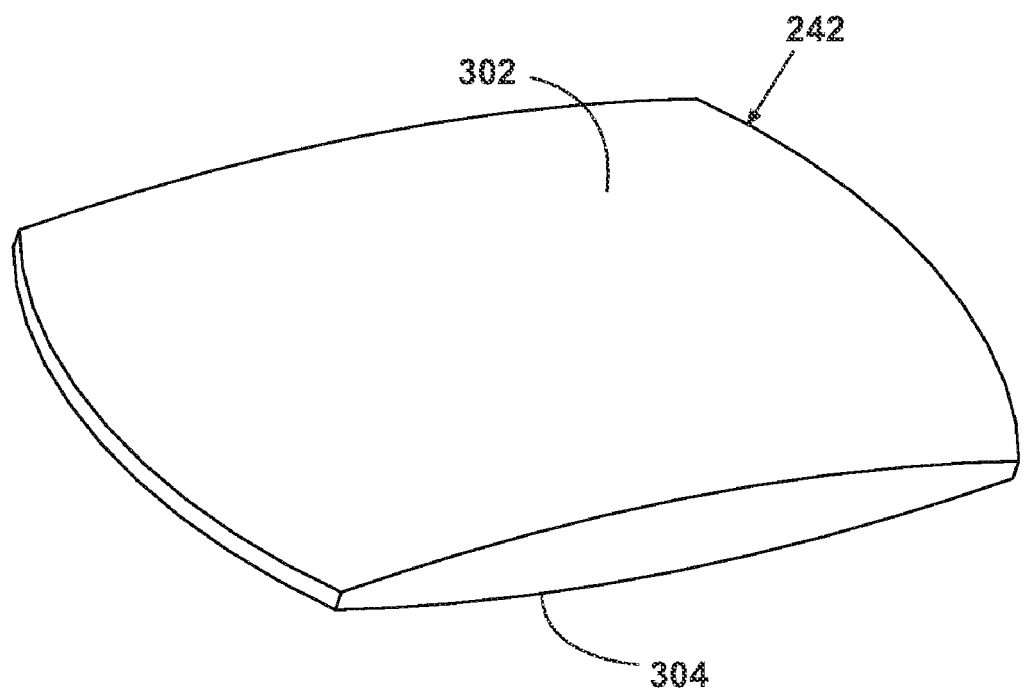
FIG. 18 is a perspective view of an interior view lens illustrated in FIG. 15.

Referring now to FIG. 18, the interior view lens 242 is illustrated as a somewhat rectangular body having an obverse surface 302 and an opposed reverse surface 304. The surfaces 302, 304 can be convex in order to provide a high-quality image to the vehicle operator. Alternatively, either surface 302, 304 can be planar, or the surfaces 302, 304 can each have a different degree of curvature. Although the interior view lens 242 is illustrated as fixed relative to the lens frame 240, the interior view lens 242 can be adapted for selective movement toward or away from the reflective element 244.

Figure 19:
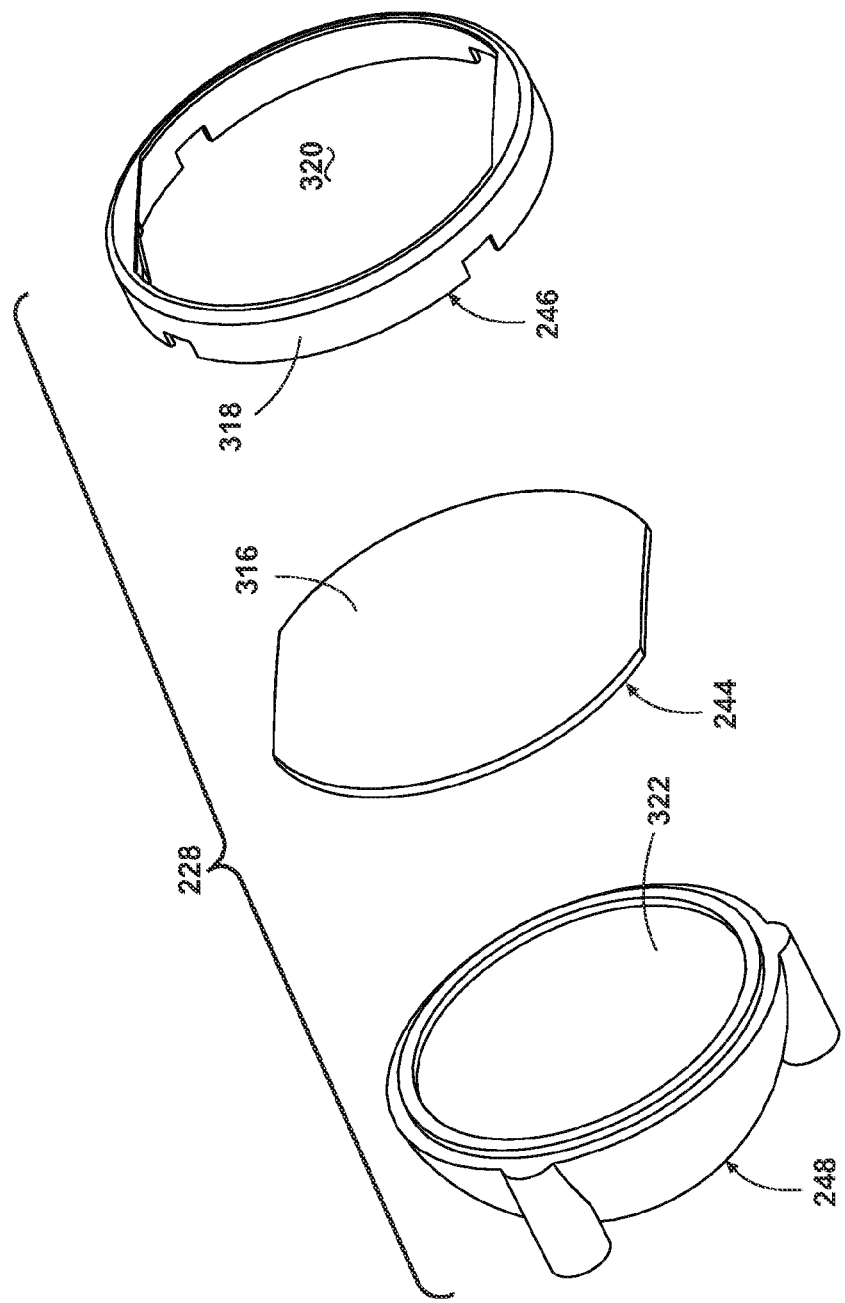
FIG. 19 is an exploded view of a reflective element assembly illustrated in FIG. 15.
Figure 20:
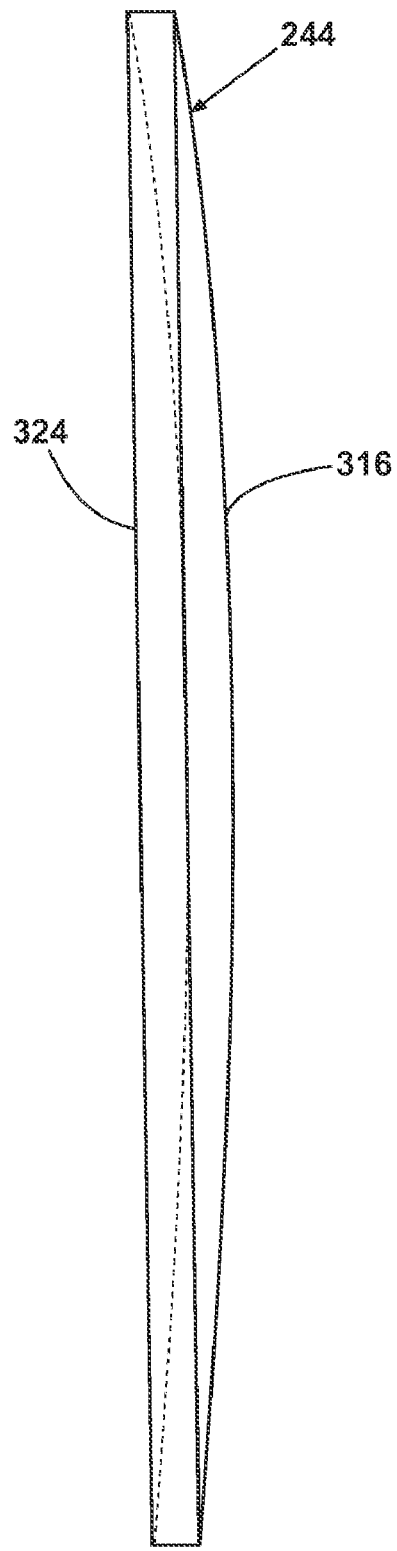
FIG. 20 is a side elevation view of a reflective element comprising a portion of the reflective element assembly illustrated in FIG. 15.

FIG. 19 illustrates the reflective element assembly comprising the juxtaposition of the reflective element adjuster 248, the reflective element 244, and the retaining ring 246. Referring also to FIG. 20, the reflective element 244 can be a generally circular, plate-like body, having a convex obverse surface 316 and an opposed reverse surface 324. Alternatively, the reverse surface can be concave so that the reflective element 244 has a uniform thickness. The convex surface 316 can cooperate with the convex interior view lens 242 to provide a high-quality image to the vehicle operator.

The reflective element adjuster 248 can comprise an adjustment assembly, similar to an electric-powered tilt actuator, which can be utilized to adjust the orientation of the reflective element 244 about two orthogonal axes. The reflective element adjuster 248 can be provided with a mounting plate 322 for attachment of the reflective element 244. An attachment device, such as an adhesive or retaining fingers, can be utilized to join the planar surface 324 to the mounting plate 322.

The retaining ring 246 can comprise a shallow annular wall 318 defining a reflective element opening 320. The retaining ring 246 can be attached to the reflective element adjuster 248 through an attachment device, such as an adhesive, a snap-fit connection, or retaining fingers, to help retain the reflective element 244 to the reflective element adjuster 248. The retaining ring 246 can also seal the perimeter of the reflective element adjuster 248 to minimize the migration of liquid and debris into the reflective element adjuster 248.

Referring back to FIGS. 12-15, the outer housing 222 can be an irregularly-shaped, shell-like body having a reflective element end 260 and a window glass seal end 262 (FIG. 15). The reflective element end 260 is illustrated as partially spherical and defining a reflective element cavity 264. The rounded configuration of the reflective element end 260 can provide reduced aerodynamic drag force while accommodating the reflective element assembly 228.

The outer housing 222 can be bounded by a leading edge 270, a glass sealing edge 272, and a lower edge 274. The leading edge 270, glass sealing edge 272, and lower edge 274 can be adapted for incorporation into the forward portion of the window opening or the doorframe. A lower portion of the outer housing 222 can have an outer cutout 268 through which light can enter the outer housing 222 and be reflected from the reflective element assembly 228. The reflective element end 260 is illustrated as having an inner cutout 266 adapted for registry with the inner housing 224. An interior portion (not shown) of the outer housing 222 can be adapted for registry with an adjoining edge of the lens frame 240.

The inner housing 224 can be an irregularly-shaped, shell-like portion having a reflective element end 276 and an opposed lens end 278. The inner housing 224 can be provided with a leading edge 280 adapted for registry with the inner cutout 266, and a lens frame seat 282 adapted for registry with an adjoining edge of the lens frame 240.

Figure 21:
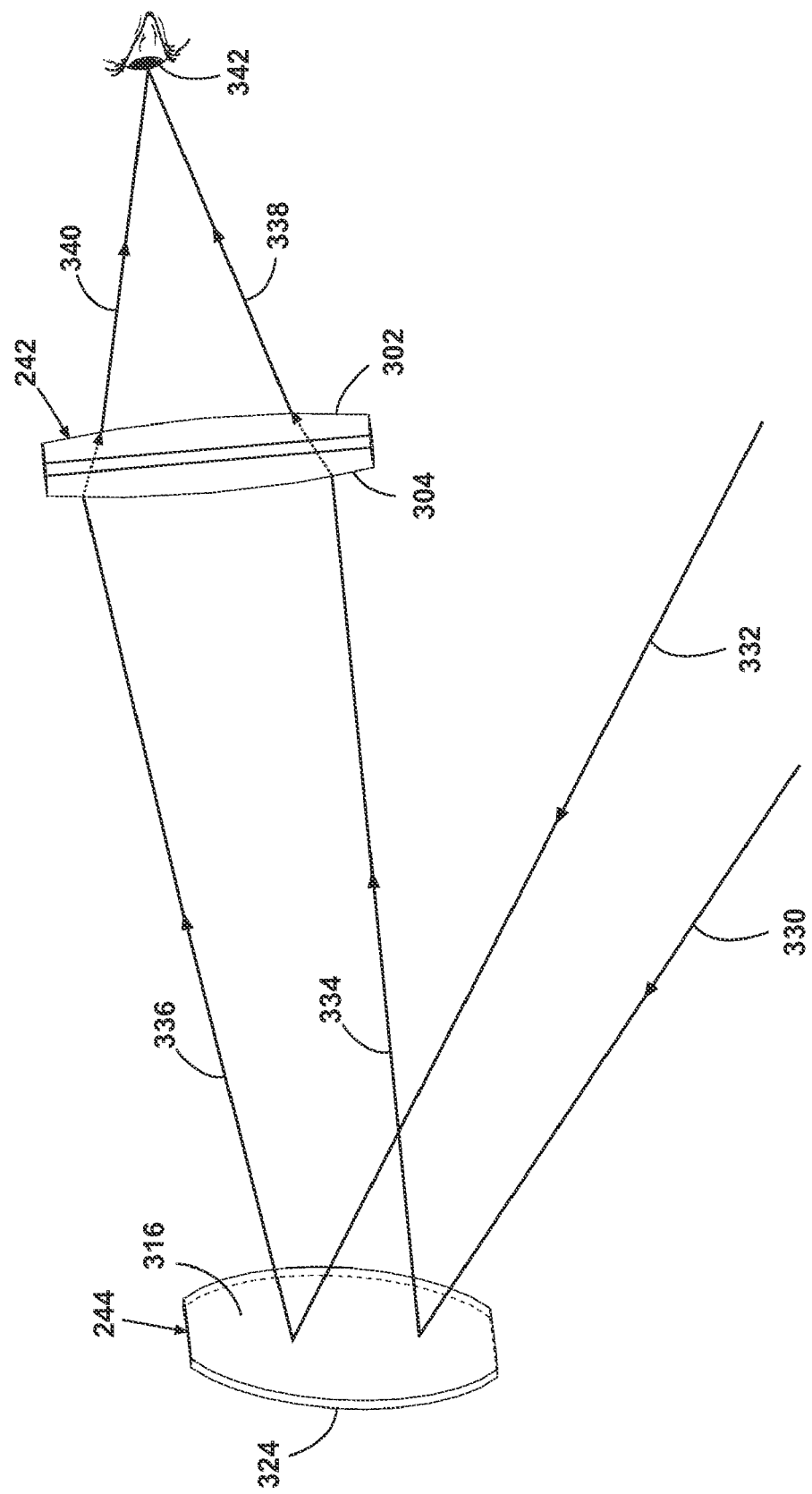
FIG. 21 is a partially schematic view of light rays directed to the eye of a driver by the reflective element and the interior view lens illustrated in FIG. 15.

Referring also to FIG. 21, assembly of the afocal rearview mirror assembly 210 can be effected by joining the outer housing 222, the inner housing 224, and the lens frame 240. The reflective element assembly 228 can be installed in the reflective element cavity 264, and the interior view lens 242 is installed in the lens frame 240. These components can all be incorporated into the door 214, resulting in a rearview mirror assembly 210 having only two optical elements. The orientation of the reflective element 244 can be selectively adjusted by operation of the reflective element adjuster 248 to direct light through the interior view lens 242 and into the eye 342 of an occupant.

For example, a first incident light ray 330 and a second incident light ray 332 can converge through the outer housing 222 and be reflected by the convex surface 316 of the reflective element 244. A first reflected light ray 334 and a second reflected light ray 336 can travel from the convex surface 316 through the reverse surface 304 and interior of the interior view lens 242 to exit the obverse surface 302. A first image light ray 338 and a second image light ray 340 can traverse the distance between the interior view lens 242 and the occupant's eye 342 to provide the occupant with a high quality image of an enhanced operational field of view.

Figure 22:
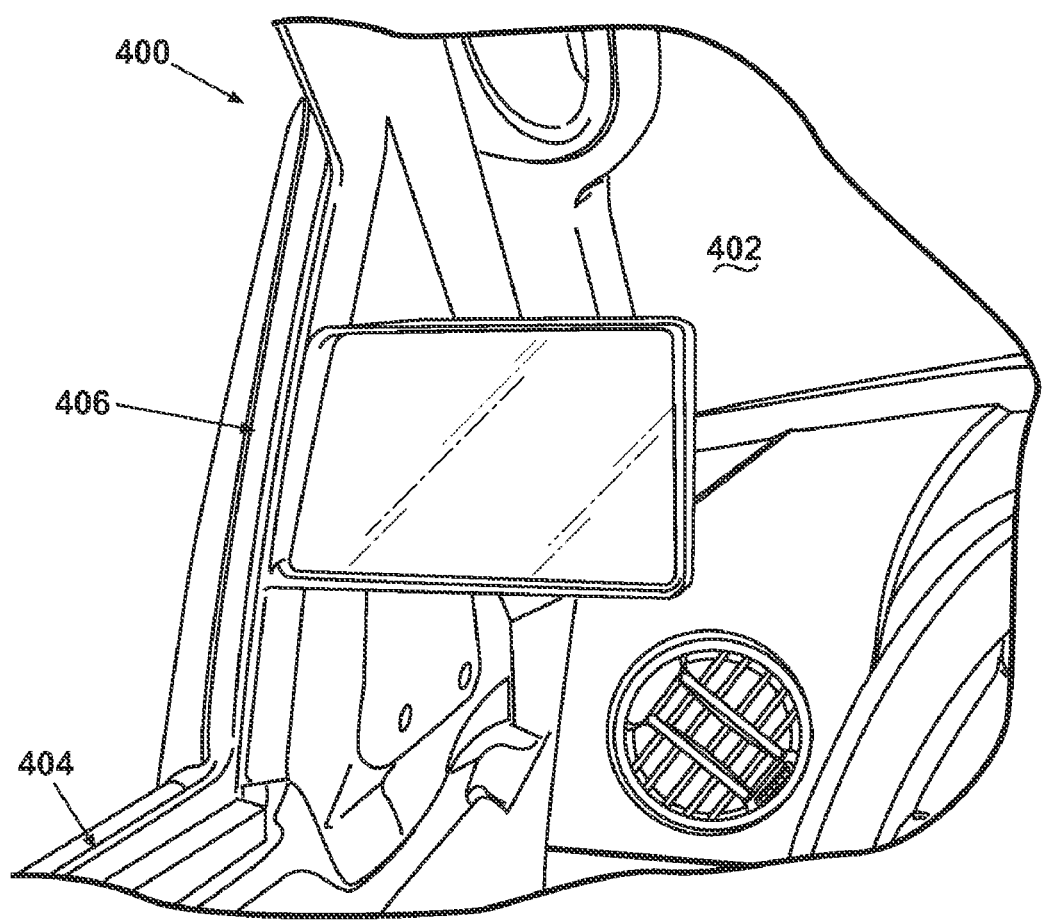
FIG. 22 is a perspective view from the interior of a motor vehicle illustrating a third embodiment of the invention comprising an afocal rearview mirror assembly.

A third embodiment, illustrated in FIGS. 22-28, has even fewer optical assembly elements and can be mounted entirely within the interior of the motor vehicle. FIG. 22 illustrates a portion of the driver's side interior of a motor vehicle 400, a windshield 402 and a driver's side door 404. A third embodiment of an afocal rearview mirror assembly 406 is illustrated coupled with the door 404, although the mirror assembly 406 can be mounted to a dashboard, e.g. near the lower left corner of the windshield, or other locations providing minimal obstruction of an operator's forward view. The mirror assembly 406 can be similar in function to the mirror assemblies previously described herein. However the mirror assembly 406 can be distinguished from the previously-described mirror assemblies in that the entire mirror assembly can be located in the interior of the motor vehicle 400.

Figure 23:
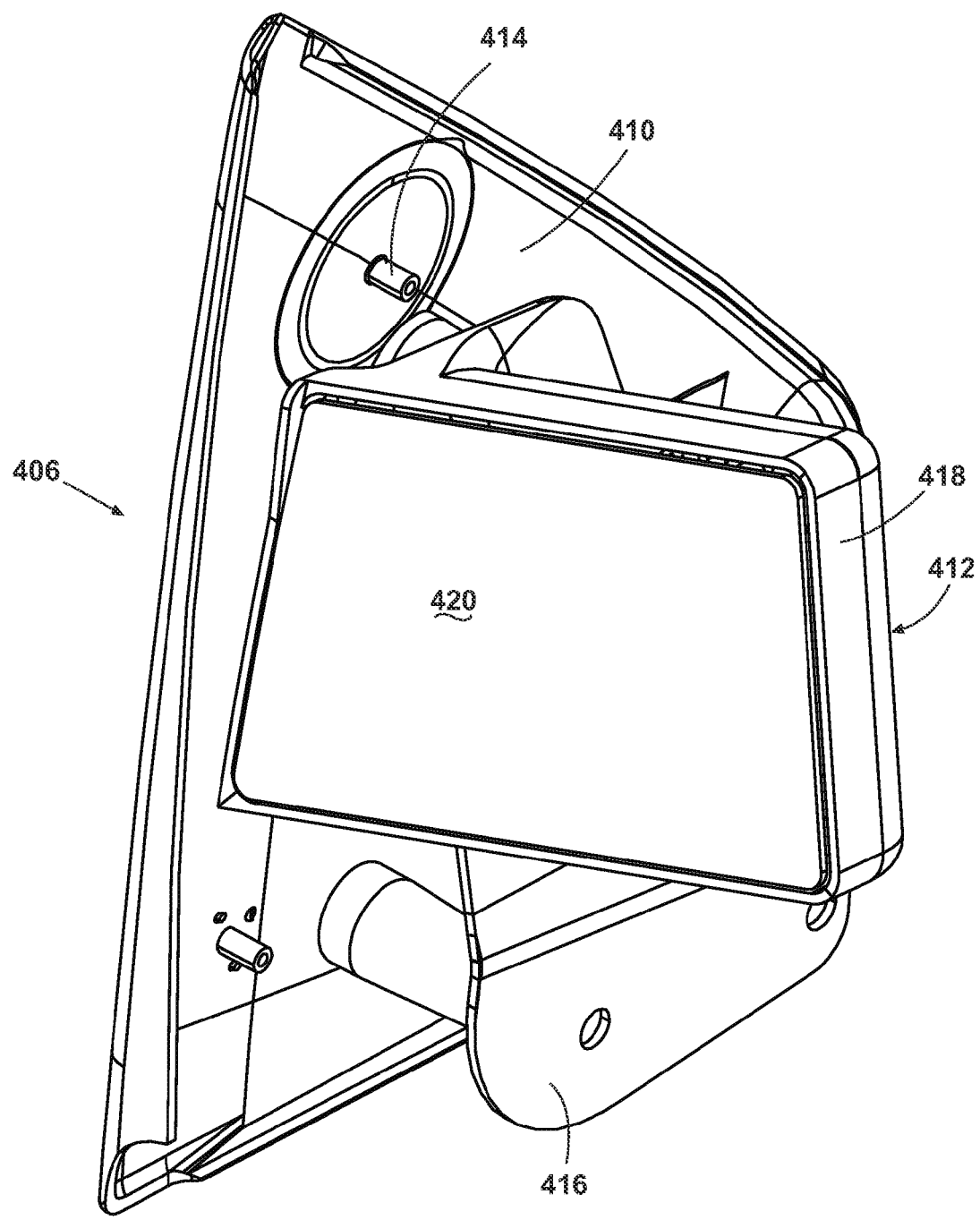
FIG. 23 is an enlarged perspective view of the afocal rearview mirror assembly illustrated in FIG. 22.
Figure 24:
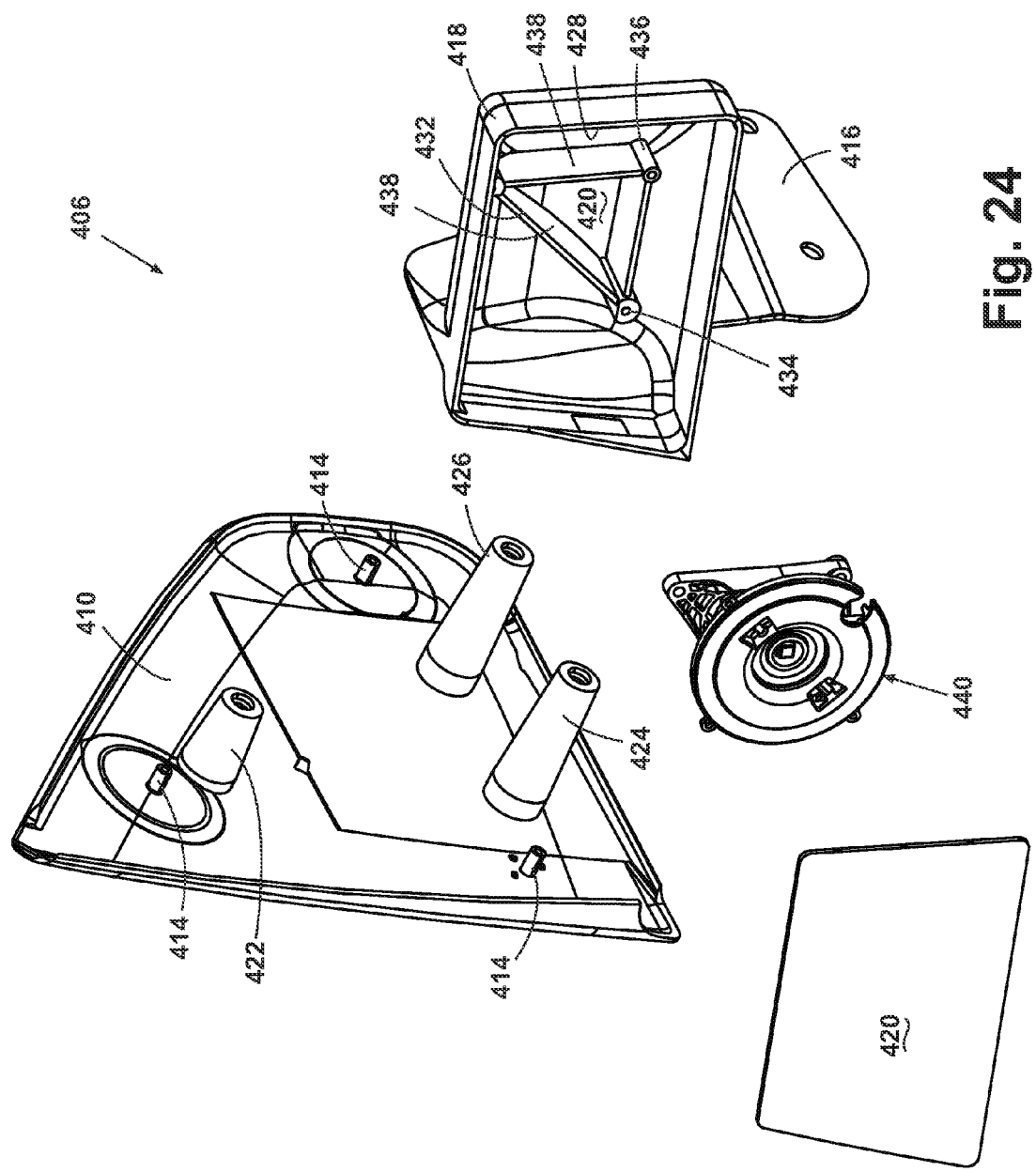
FIG. 24 is an exploded view of the afocal rearview mirror assembly illustrated in FIG. 23, comprising a base plate, a housing, a reflective element adjustment assembly, and a reflective element.

FIG. 23 illustrates the mirror assembly 406 comprising a base plate 410, to which can be coupled a reflective element assembly 412. Referring also to FIG. 24, the base plate 410 can be provided with a plurality of assembly projections 414, an upper fastener boss 422, and a pair of lower fastener bosses 424, 426. The base plate 410 can be configured to conform aesthetically with the configuration of the motor vehicle 400 in the region in which the base plate 410 can be mounted.

The reflective element assembly 412 can comprise a housing 418 enclosing a reflective element 420. The reflective element 420 can be curved, i.e. parabolic, concave, circular, and the like, or planar. The housing 418 can be attached to the base plate 410 with a bracket 416 incorporated into the housing 418. The bracket 416 can be attached to the base plate 410 through fasteners (not shown), such as screws, inserted through apertures in the bracket 416 for seating in the fastener bosses 422, 424, 426.

The housing 418 can comprise an opening 428 into a housing interior 430. The housing interior 430 can have a mounting frame 432 incorporated into a housing wall located opposite the opening 428. The mounting frame 432 can comprise a first fastener boss 434 and a pair of second fastener bosses 436, one of which is partially hidden in FIG. 24. The bosses 434, 436 can be connected by struts 438 to form a frame to which a reflective element adjustment assembly 440 can be attached.

Figure 25:
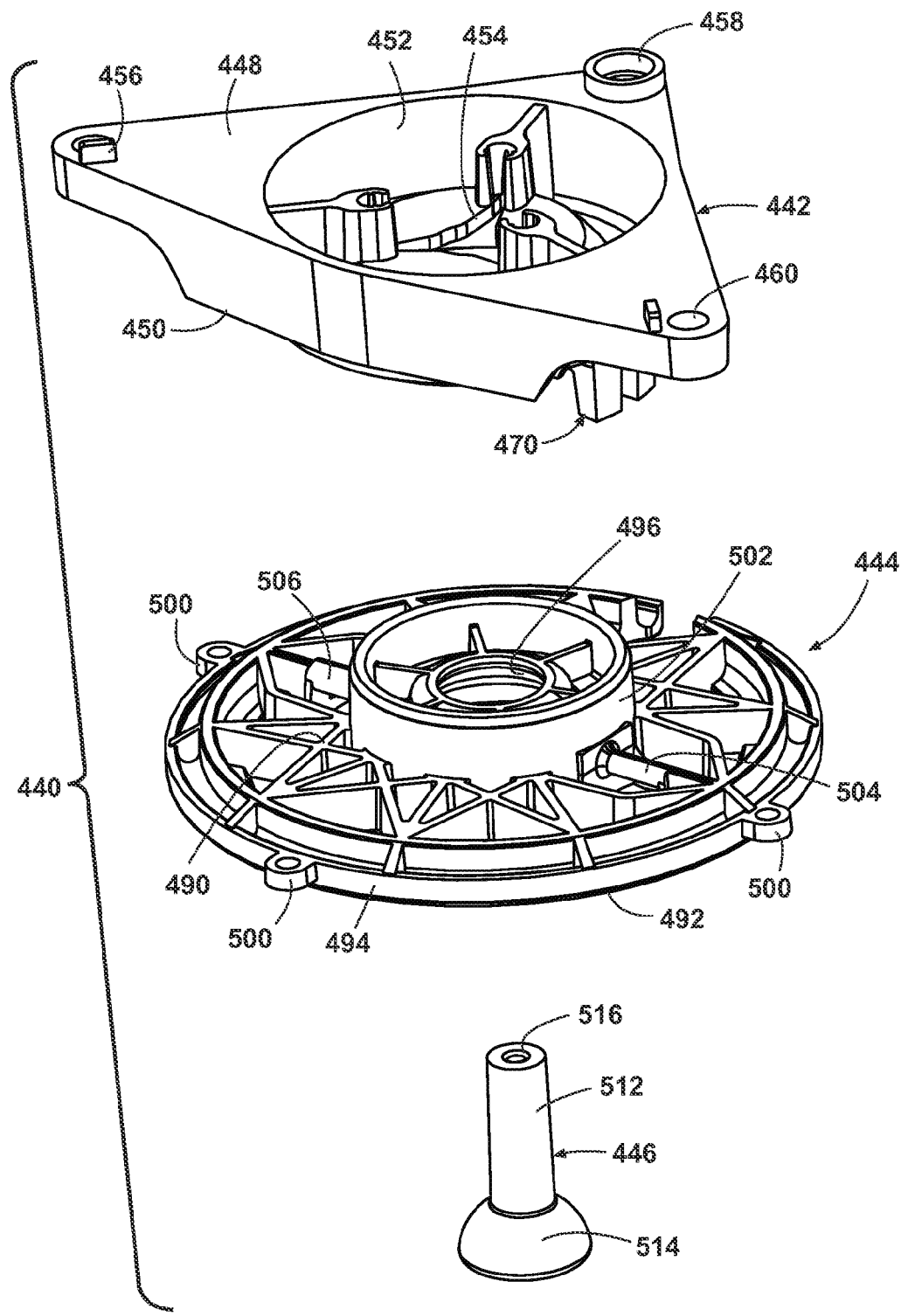
FIG. 25 is an exploded view from above of the reflective element adjustment assembly illustrated in FIG. 23.
Figure 26:
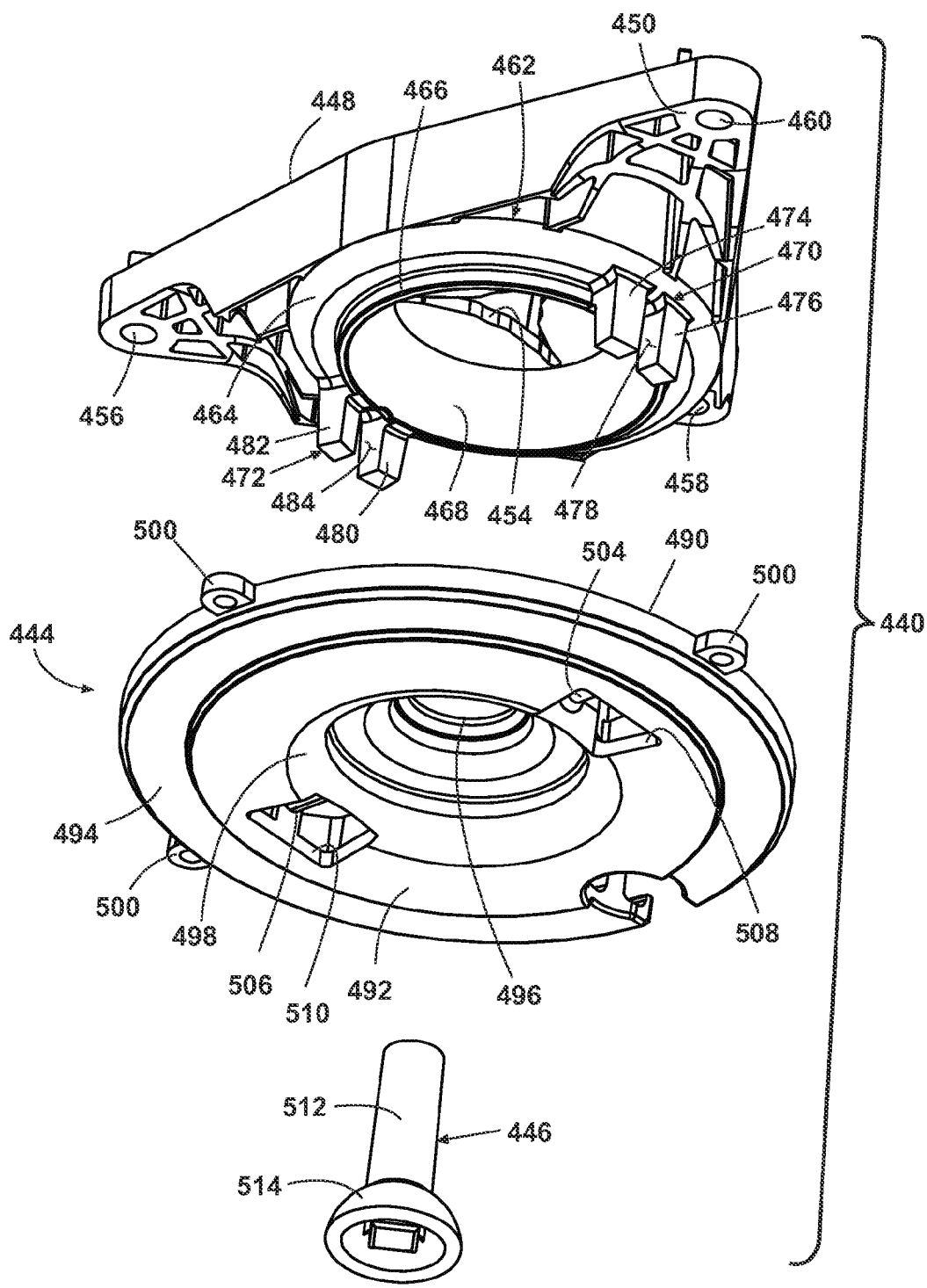
FIG. 26 is an exploded view from below of the reflective element adjustment assembly illustrated in FIG. 25.

Referring to FIGS. 25 and 26, the reflective element adjustment assembly 440 can comprise a mounting plate 442, a tilt plate 444, and a universal fastener 446. The reflective element adjustment assembly 440 can also have a reflective element adjuster (not shown) similar to a known electric-powered tilt actuator or the reflective element adjuster 248 of the second embodiment. The reflective element adjuster can be utilized to adjust the orientation of the reflective element 420 about two orthogonal axes The mounting plate 442 can be a generally triangular plate-like member having a reverse side 448 and then opposed to obverse side 450. The reverse side 448 can be interrupted by a generally cylindrical receptacle 452 centered in the mounting plate 442. The center of the cylindrical receptacle 452 can be penetrated by an opening 454 to comprise a universal fastener seat for purposes described hereinafter.

The reflective element adjustment assembly 440 can be provided with an upper fastener aperture 456, a first lower fastener aperture 458, and a second lower fastener aperture 460, located at the angular ends of the mounting plate 442. Referring again to FIG. 24, the first lower fastener aperture 458 can be provided with an annular lip that can seat the first fastener boss 434, thereby ensuring correct mounting of the mounting plate 442 to the mounting frame 432.

Extending generally orthogonally away from the obverse side 450 can be a tilt plate annulus 462 comprising an annular outer flange 464 coupled with an annular inner lip 466. The outer flange 464 can be parallel to the reverse side 448. The inner lip 466 defines an opening 468 that can be generally coextensive and coaxial with the receptacle 452.

Extending generally orthogonally away from the outer flange 464 are first and second tilt control structures 470, 472, respectively. The first tilt control structure 470 can comprise a pair of somewhat rectilinear tilt control pedestals 474, 476 arranged in spaced disposition to define a tilt control slot 478. Diametrically opposite the first tilt control structure 470, the second tilt control structure 472 can comprise a pair of somewhat rectilinear tilt control pedestals 480, 482 arranged in spaced disposition to define a tilt control slot 484.

The tilt plate 444 can be a circular, generally plate-like member comprising a reverse side 490 and an obverse side

492. The tilt plate 444 can comprise an annular outer flange 494, transitioning through a partially funnel-like concave transition wall 498 to an opening 496. Extending about the perimeter of the outer flange 494 are a plurality of mounting ears 500 for mounting the reflective element 420 to the tilt plate 444. The transition wall 498 can be penetrated by diametrically-disposed, generally a rectilinear first and second pin openings 508, 510, respectively.

Extending generally orthogonally from the reverse side 490 can be an annular wall 502 concentric about the opening 496. The rim of the opening 496 lies somewhat away from and parallel to the reverse side 490. The annular wall 502 lies somewhat further away from and parallel to the reverse side 490. The annular wall 502 can be coupled with the reverse side of the concave portion of the transition wall 498 by structural elements to maintain a preselected strength and configuration of the transition wall 498.

Extending diametrically away from the annular wall 502 are first and second tilt pins 504, 506 arranged in spaced disposition with the pin openings 508, 510, respectively. The tilt pins 504, 506 are adapted for slidable registry with the tilt control slot 478, 484. The tilt control structures 470, 472 extend past the tilt pins 504, 506 to extend through the pin openings 508, 510 when the mounting plate 442 and tilt plate 444 are brought into operable engagement. The tilt plate 444 can rotate about a first axis extending coaxially through the tilt pins 504, 506. However, the rotation will be limited by contact of the tilt control structures 470, 472 with the edges of the pin openings 508, 510. The tilt plate 444 can also rotate about a second, diametric axis extending orthogonally to the first axis, with the tilt pins 504, 506 sliding along the tilt control slots 478, 484.

The universal fastener 446 can be an elongated somewhat tube-like member having a cylindrical universal fastener shaft 512 transitioning to a universal fastener bearing 514. The universal fastener bearing 514 has a convex configuration complementary to the concave portion of the transition wall 498 adjacent the opening 496. The universal fastener 446 couples the mounting plate 442 with the tilt plate 444 when it is inserted through the opening 496 and the universal fastener seat 454, as illustrated in FIG. 24. The universal fastener 446 can be fixedly attached to the mounting plate 442 through suitable fasteners, or other means such as adhesives, welding, and the like. The concave/convex configuration of the coupling enables the tilt plate 444 to tilt relative to the mounting plate 442. Operation of the tilt plate 444 can be accomplished through mechanical means, such as a cable control, or through an electric powered tilt actuator (neither shown).

Figure 27:
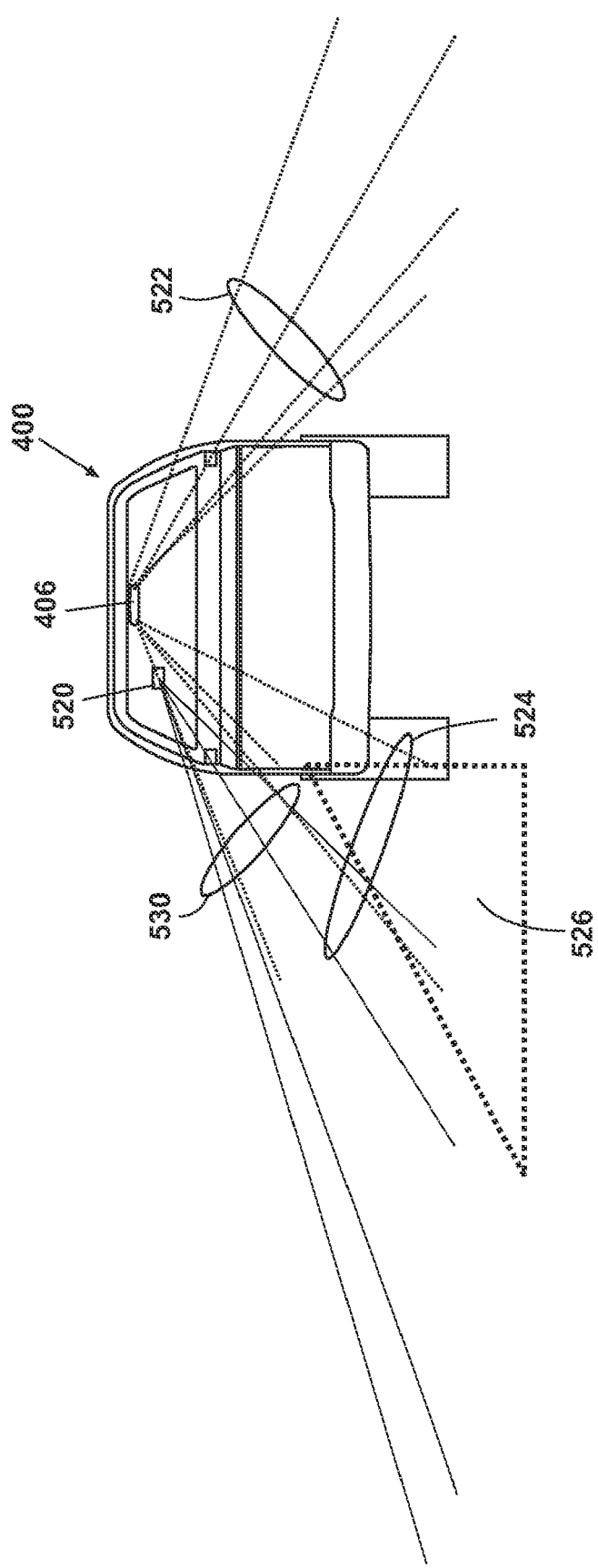
FIG. 27 is a schematic side view of light rays reflected from a pair of afocal rearview mirror assemblies illustrated in FIG. 23 mounted in a motor vehicle.
Figure 28:
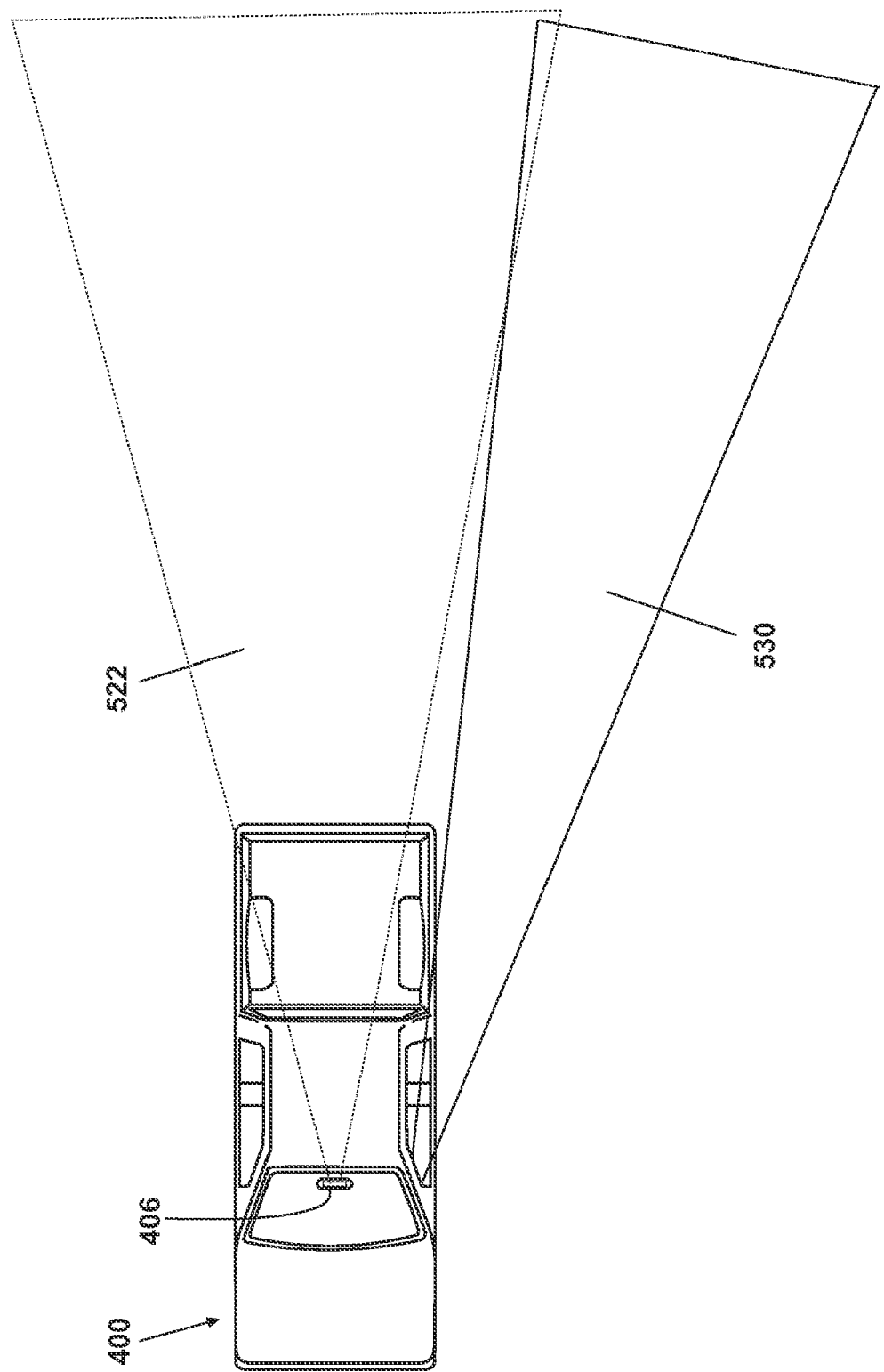
FIG. 28 is a schematic plan view of the motor vehicle and light rays illustrated in FIG. 27.

FIGS. 27 and 28 illustrate an afocal rearview mirror assembly 406 mounted in a motor vehicle 400 as a center-mounted rearview mirror assembly, and a side view mirror assembly 520 mounted to or adjacent the windshield. Alternatively, a known center-mounted rearview mirror assembly can be utilized with an afocal side view mirror 520 attached either to the windshield or the driver's-side door. This configuration can enable an operator to observe the rear of the vehicle 400, represented by rearview mirror light rays 522, 524, in the center-mounted rearview mirror 406 and the hidden zone 526, represented by side view mirror light rays 524, 530.

Complete visual coverage of the rear of a motor vehicle, including the hidden zone, can be accomplished by the use of the afocal rearview mirror assembly and a center-mounted rearview mirror assembly. Both mirror assemblies can be located within the motor vehicle, thereby reducing wind noise and drag associated with an exterior mirror assembly.

The angle of view provided by the interior afocal rearview mirror assembly is somewhat different than with a conventional mirror assembly. An operator will see less of the side the vehicle, but more in the hidden zone, i.e. the area between the operator's peripheral vision and what is typically seen with conventional outside mirror assemblies. The mechanics of the mirror, e.g. an actuator, can be controlled by known control devices. Furthermore, the interior afocal rearview mirror assembly can be assembled away from the vehicle, and later installed from outside the vehicle, such as through the door.

The afocal rearview mirror assembly described herein is an improvement over the prior art in several unique ways. The afocal rearview mirror assembly provides an enhanced operational field of view, while providing a flat, undistorted image typical of planar reflective elements. Only two optical elements are utilized, thus greatly simplifying the fabrication and operation of the mirror assembly. The brightness of the image is higher and clearer than prior art mirror assemblies utilizing multiple optical components. The angular magnification of the primary image can be retained at approximately a 1:1 ratio. The afocal rearview mirror assembly can have a lower weight and lower manufacturing costs than known mirror assemblies. The mirror assembly can also reduce eye strain in the driver.

The afocal rearview mirror assembly can accommodate drivers of varying sizes without adjustment of the exterior exposed optical components, thus minimizing the possibility of obstruction by housing lips or rims. Finally, the afocal rearview mirror assembly generally protrudes less than a comparable prior art mirror assembly.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. An afocal rearview mirror assembly for a motor vehicle having a side door and a dashboard, the afocal rearview mirror assembly comprising:
    a housing attached to the motor vehicle adjacent the side door and a dashboard, and having a low-profile, rounded external portion and an internal portion;
    a selectively movable reflective element enclosed within the housing, and having opposed curved surfaces for reflecting unfocused light rays from outside the external portion through the internal portion of the housing; and
    a selectively movable lens enclosed within the internal portion of the housing for controlling light transmitted from the selectively movable reflective element to an occupant of the motor vehicle;
    wherein the selectively movable lens is adaptable to converge the unfocused light rays reflected from the selectively movable reflective element to a focused image observable by the occupant of the motor vehicle.

2. The afocal rearview mirror assembly according to claim 1 wherein the external portion of the housing is located externally of the motor vehicle and the internal portion of the housing is located within the interior of the motor vehicle.

3. The afocal rearview mirror assembly according to claim 1 wherein the selectively movable reflective element has a convex surface and a concave surface.

4. The afocal rearview mirror assembly according to claim 1, and further comprising an adjustment assembly for adjusting the orientation of the selectively movable reflective element.

5. The afocal rearview mirror assembly according to claim 1 wherein the selectively movable lens can be adjusted so that an image is focused at eyes of the occupant of the motor vehicle .

6. The afocal rearview mirror assembly according to claim 1 wherein the selectively movable reflective element and the selectively movable lens can cooperatively provide an enlarged operational field of view of at least one of an exterior rear region and an exterior side region of the motor vehicle.

7. The afocal rearview mirror assembly according to claim 1 wherein the housing encloses a single reflective element and a single lens.

* * * * *